US010829028B2

(12) United States Patent
Delgadillo, Jr.

(10) Patent No.: US 10,829,028 B2
(45) Date of Patent: Nov. 10, 2020

(54) POP-UP CAMPER AND ASSOCIATED ACCESSORIES

(71) Applicant: Ignacio Delgadillo, Jr., St. Helena, CA (US)

(72) Inventor: Ignacio Delgadillo, Jr., St. Helena, CA (US)

( * ) Notice: Subject to any disclaimer, the term of this patent is extended or adjusted under 35 U.S.C. 154(b) by 45 days.

(21) Appl. No.: 16/235,801

(22) Filed: Dec. 28, 2018

(65) Prior Publication Data

US 2019/0202333 A1 Jul. 4, 2019

Related U.S. Application Data

(60) Provisional application No. 62/611,451, filed on Dec. 28, 2017.

(51) Int. Cl.
*B60P 3/34* (2006.01)
*B60J 7/16* (2006.01)

(52) U.S. Cl.
CPC ............. *B60P 3/341* (2013.01); *B60J 7/1657* (2013.01)

(58) Field of Classification Search
CPC ......... B60P 3/341; B60J 7/1621; B60J 7/1657
USPC .......................................................... 296/160
See application file for complete search history.

(56) References Cited

U.S. PATENT DOCUMENTS 3,411,819 A * 11/1968 Tyree ........................ B60P 3/38 296/164
3,603,330 A * 9/1971 Halldorson ............... B60P 3/38 135/88.16
6,394,531 B2 * 5/2002 Thompson .............. B60P 3/341 296/160
8,182,020 B2 * 5/2012 Herndon .............. B62D 35/001 296/100.06
10,086,684 B1 * 10/2018 Stamm, Jr. ............. B60J 7/1621

OTHER PUBLICATIONS

Keder Solutions, What is Keder? https://www.kedersolutionscom/what-is-keder/, printed Dec. 27, 2018 (4 pp.).
Thule Group, Thule Group acquires leading North American Roof Top Ten Company, http://www.thulegroup.com/en/content/thule-group-acquires-leading-north-american-roof-top-tent-company, Dec. 18, 2018 (2 pp.).
Go Fast Campers, https://gofastcampers.com/ (2 pp.).
AT Overland, Summit Truck Topper, http://adventuretrailers.com/campers/campers-summit-truck-topper/, printed Dec. 27, 2018 (2 pp.).

(Continued)

*Primary Examiner* — Joseph D. Pape
(74) *Attorney, Agent, or Firm* — Eversheds Sutherland (US) LLP

(57) ABSTRACT

A pop-up camper on a vehicle is disclosed. The pop-up camper may include a plurality of walls. The plurality of walls may include at least one sidewall, a lid hinged to the at least one sidewall, and a door attached to the at least one sidewall. The pop-up camper may also include a tent configured to be disposed between the lid and the at least one sidewall. Furthermore, at least one actuating mechanism may be attached to the lid and the at least one sidewall. The lid may be configured to rotate between an open lid position and a closed lid position. In addition, the actuating mechanism is configured to assist the lid rotation to the open lid position.

19 Claims, 19 Drawing Sheets

100
128
158
152
126
148
144
134
130
108
112
142
104
106
102

(56) References Cited

OTHER PUBLICATIONS

Snap Outfitters, Snap! Treehouse, https://snapoutfitters.com/product/snap-truck-camper/, printed Dec. 27, 2018 (11 pp.).
Fort Overlanding, Instagram photos and videos, https://instagram.com/fortoverlanding, printed Dec. 27, 2018 (3 pp.).

* cited by examiner

POP-UP CAMPER AND ASSOCIATED ACCESSORIES

CROSS-REFERENCE TO RELATED APPLICATIONS

The disclosure claims priority to and the benefit of U.S. Provisional Patent Application No. 62/611,451, filed Dec. 28, 2017, which is hereby incorporated by reference herein in its entirety.

FIELD OF THE DISCLOSURE

The disclosure generally relates to a camper and more particularly relates to a pop-up camper for mounting onto a vehicle bed.

BACKGROUND

Pop-up campers are installed on a vehicle to provide a safe and comfortable shelter for when the vehicle passengers need to rest. Pop-up campers are useful for long-distance traveling, sightseeing, as well as long and short-term camping. A pop-up camper would be useful for long-distance traveling because the camper provides a convenient space for the travelers to erect a temporary safe and clean structure for sleeping. Current pop-up campers commonly do not provide an adequately sealed compartment for traveling in the backcountry. Often, the travelers must clean the space within the camper of dust and debris that works itself into the cabin space. Keeping the compartment sealed from outside silt and grime would save time and energy. Someone who travels long distances would understandably be frustrated and have added exhaustion when finding that debris has accumulated within their sleeping space by the time of arriving at a resting place.

Traditional pop-up campers have a litany of other deficiencies as well. Commonly, pop-up campers are hard to install and are difficult to set up. First, pop-up campers typically are very difficult to install because they require extensive welding and are extremely heavy. The pop-up campers also commonly fit over the tire wells in the bed of a truck and thus arbitrarily limiting the total space available to a traveler. Another issue is lifting and lowering the traditional campers tends to be a tedious and difficult task to set up for the night. To set up traditional pop-up campers for the night, a traveler needs to be on the outside of the pop-up camper exposed to the elements to line the shell of the camper with tent fabric. Thus, the current pop-up campers give an insufficient means for providing an adequate, easy, and adaptable space for traveling and sleeping in a vehicle.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Figure 1:
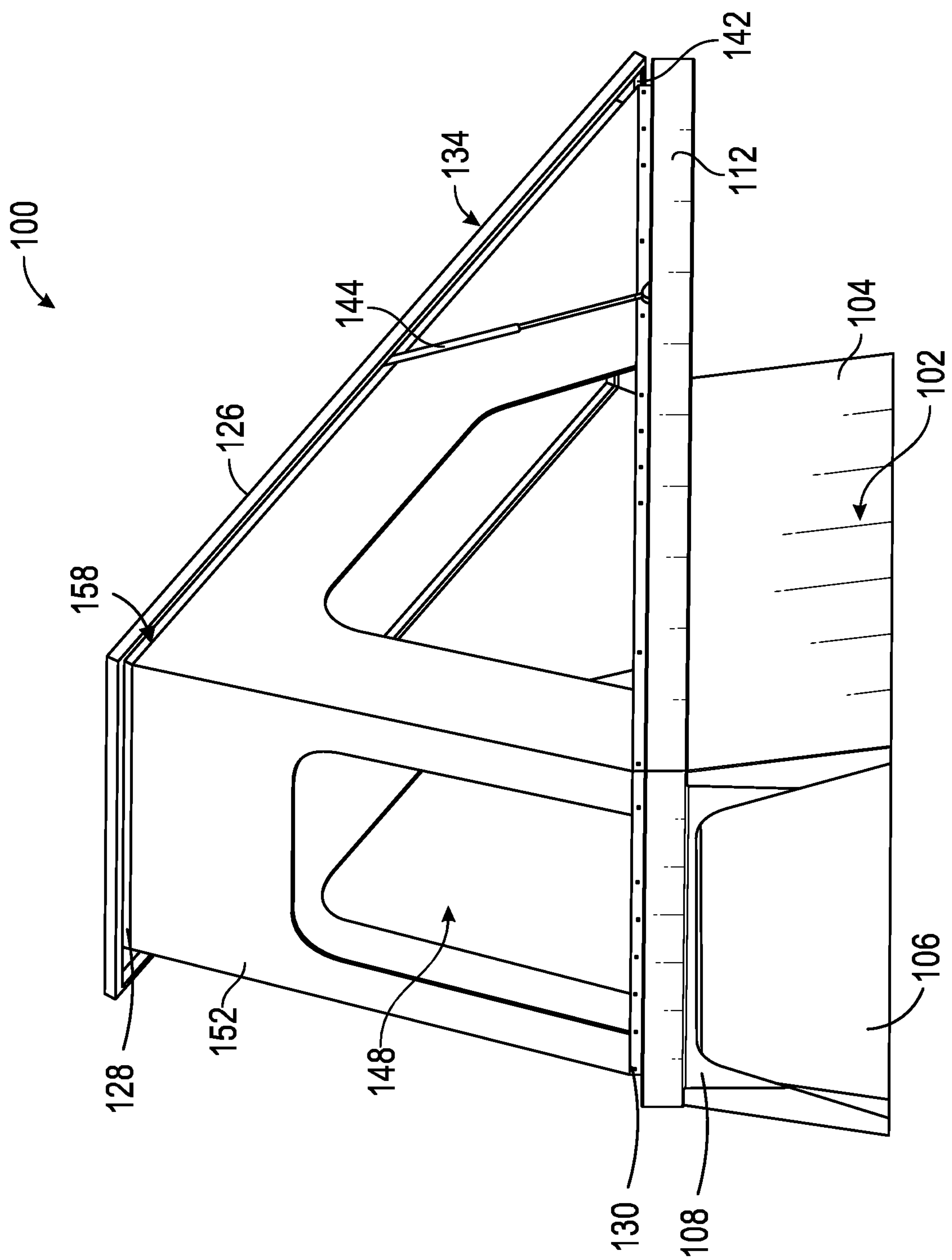
FIG. 1 depicts a perspective view of a pop-up camper in an open lid position in accordance with one or more embodiments of the disclosure.

The present disclosure provides an adjustable floor, easy installation, and a spacious interior for the enjoyment of a pop-up camper. Methods of installing and using the pop-up camper are disclosed. A pop-up camper is typically used by a traveler when pulling over on the side of the road for the night or for staying in a campground. One problem, however, is pop-up campers commonly struggle to keep dust and debris from the interior. Furthermore, many pop-up campers inefficiently use the vehicle space available on a vehicle and are difficult to set up. Embodiments of the present invention relate to using all of the space efficiently and effectively, help protect the interior from dust that may try to creep into the interior of the camper, and the embodiments are quick to set up or take down.

In certain embodiments, the pop-up camper may include a plurality of walls, a lid, and a tent. In this manner, the tent may extend between the plurality of walls and the lid when the lid is rotated to an open lid position. The tent is configured to selectively attach between the plurality of walls and the lid by sliding within a set of tracks disposed on the plurality of walls and the lid. That is, the tent may include one or more cords that slide within the set of tracks disposed on the pop-up camper. The tent may include an impermeable fabric that extends along the outside of the tent, and the fabric may extend over the tracks. Since the impermeable material extends over the tracks, the debris, rain, and other elements may be prevented from entering the cabin (i.e., the interior) of the pop-up camper.

In certain embodiments, the pop-up camper may include a set of rails extending from the plurality of walls and a plurality of bed panels configured to lay on the set of rails. That is, two rails may be disposed on opposite walls within the pop-up camper. A bed panel within the plurality of bed panels may extend between the two rails and securely lay in place. In this manner, the bed panel may provide a space for campers to lay but still provide standing room elsewhere in the cabin space of the pop-up camper. In some instances, multiple bed panels may be set onto the set of rails separating a top portion of the pop-up camper from a bottom portion of the pop-up camper. The plurality of bed panels may be disposed in a variety of other configurations to provide a bed, a couch, a standing space, or another type of configuration. The bed panels may be secured onto the rails by frictional pads, fasteners, or some other method.

In certain embodiments, the plurality of walls on the pop-up camper may slide onto a vehicle. In some instances, the plurality of wall may set on the rails (e.g., walls) of a vehicle bed. For example, the vehicle bed and vehicle bed rails may complement the plurality of walls in size and shape. In this manner, the plurality of walls sit on the vehicle bed rails and extend therefrom. Clamps and/or other attachment mechanisms may secure the plurality of walls onto the vehicle bed.

In certain embodiments, the pop-up camper may include a plurality of walls. For example, the plurality of walls may include a first sidewall, a second sidewall, a front wall, and opposed back wall. The first sidewall and the second sidewall may be disposed on opposing sides of a vehicle bed. In other instances, the plurality of walls may have different arrangements, such as the first sidewall and the second sidewall being adjacent to one another. Each sidewall may extend the length of the respective side of the vehicle bed. In some instances, the vehicle bed may be a truck bed. The first sidewall may be disposed on one side of the truck bed and the second sidewall may be disposed on the other side of the truck bed. Between the first sidewall and the second sidewall may be the front wall and the opposed back wall. That is, the front wall may be disposed above a vehicle bed gate (e.g., the truck bed gate configured to open and close). The opposed back wall may be disposed adjacent to the vehicle cabin. As used herein, the terms "front wall" and "opposed back wall" may be interchangeable.

In certain embodiments, opposite the vehicle bed, a rim wall may be set around the first sidewall, the second sidewall, the front wall, and the opposed back wall (together also referred to as lower walls). In this manner, the first sidewall, the second sidewall, the front wall, and the opposed back wall may form a rectangular shape. In other instances, the plurality of walls may form another shape, such as spherical, square, triangular, or some other shape. In some instances, the rim wall may extend beyond the lower walls. That is, the rim wall may include a floor that extends over the vehicle cabin roof and between side portions of the rim wall. In other embodiments, other walls may be included within the pop-up camper. For example, a rim wall may extend beyond both the front wall and the opposed back wall and include a floor extending between the rim wall side portions.

In certain embodiments, the rim wall and other walls in the plurality of walls may include a rail configured to hold a plurality of bed panels. For example, the rail may be on a parallel plane as the vehicle bed and extend perpendicularly from the plurality of walls. In this manner, gravity, friction, and/or frictional pads may help to secure the bed panels configured to be disposed on the rail. In some instances, the rail may be flat and continuous. In other instances, the rail may be an attachment mechanism configured to slide along a track. For example, the attachment mechanism may secure onto the bed panel and be able to roll along a track to move the bed from one point to another point within the pop-up camper. In other embodiments, the bed panel may include a set of rollers, wheels, or other mechanism to assist with sliding the bed panels along the rail.

In certain embodiments, the pop-up camper includes a plurality of bed panels that are configured to adjust and/or stack within the pop-up camper. The bed panels may include a padding and a frame. In this manner, the frame may support the padding as well as extend and set onto the rail within the pop-up camper. As previously discussed, the bed panel may include rollers, wheels, or another mechanism that is disposed on the frame. The rollers or other mechanisms may roll along the track. In some instances, the bed panels may be secured into place by fasteners such as pins, screws, hook and loop, or some other type of latching mechanism.

In certain embodiments, the pop-up camper may include a door with at least one door latch. For example, the door may be rotatable about a hinge coupled to the front wall. In addition, an actuating mechanism may assist the door to a second position (e.g., open) from a first position (e.g., closed). In some instances, the actuating mechanism may be a gas spring, compression spring, tension spring, or some other mechanism. The door may include at least one door latch configured to rotate between a locked position and an unlocked position. That is, the at least one door latch may rotate between the two positions. In other instances, the door may include another securing mechanism configured to secure the door between the locked position and the unlocked position. Much like the lid discussed herein in the open lid position, the second position for the door may be a selectively rigid position. That is, the door may require force to rotate back into the first position. In some instances, the door may extend the entire length of the front wall. In other instances, multiple doors may be disposed on the front wall. In yet other instances, the door may be the entire front wall.

In certain embodiments, the pop-up camper may include a utility panel within the plurality of walls configured to store electronics and other mechanisms. That is, the utility panel may be configured a series of panels to secure switches, batteries, wiring, and other gear. Within the plurality of walls a series of channels may be disposed about the interior cabin. In this manner, the series of channels may lead to the utility panel. In some instances, the utility panel may be a rectangular volume. In other instances, the utility panel may be another shape, such as spherical, square, or some other shape. The utility panel may include a door to secure an interior storage area. In other instances, the utility panel may be open to the rest of the pop-up camper. In other embodiments, the utility panel may include a latch configured to open to the outside of the pop-up camper. In this manner, a camper may access certain electronics and/or controls for the pop-up camper. For example, the pop-up camper may be automated to move to the open lid position (e.g., the lid raise and the tent extend). The utility panel may store a switch to automate the lid, or the utility panel may contain a number of other controls.

In certain embodiments, the pop-up camper may include a lid. That is, a lid may be hinged to the rim wall, disposed onto the rim wall, and enclose the plurality of walls. For example, the lid may include at least one hinge (e.g., full hinge, pivot hinge, scissor hinge) to rotate the lid on the pop-up camper. The lid may be configured to rotate between an open lid position and a closed lid position. In the open lid position, the lid may be rotated away from the plurality of walls. In the closed lid position, the lid may secure to the rim wall and/or the plurality of walls. A camper may grapple a strap disposed on the lid to rotate the lid into the closed lid position and secure the lid in place on the pop-up camper. In this manner, the lid may include an adjustable latch that locks the lid into place. In some instances, the lid may include an actuating mechanism that extends between the lid and the plurality of walls. The actuating mechanism may be configured to assist in rotating the lid to the open lid position. That is, the actuating mechanism may be a gas spring configured to apply force in an opposing direction from the plurality of walls, thus assisting in rotating the lid to the open lid position.

In certain embodiments, the lid and plurality of walls may include insulation. For example, on the interior of the pop-up camper, insulation may line the plurality of walls and lid to keep in residual heat, cooling, and/or regulate moisture.

In certain embodiments, the lid may include at least one anchor configured to receive a lock bar. For example, the anchor may be disposed on the lid, and a complementary anchor may be disposed on the plurality of walls. A lock bar may attach to both anchors and secure the lid in the open lid position. That is, the lock bar may provide support to resist force applied to the lid to rotate to the closed lid position. In some instances, the anchors may be a tear-drop structure extending from the lid and/or plurality of walls. In other instances, the anchors may be a number of other shapes, including cube, prism, spherical, or other shape. The lock bar may be a cylindrical structure and two securing mechanisms at either end of the cylindrical structure. The securing mechanisms may be latches, fasteners, rings, or some other mechanism configured to secure the lock bar onto the anchors. The lock bar may be adjustable (e.g., extendable, bendable).

In certain embodiments the lid and the plurality of walls may include an upper track and lower track configured to receive a tent. For example, the lower track may be disposed on the rim wall and shaped in a c-channel configured to receive a cord disposed on the tent. The cord may be disposed on an outer edge of the tent and configured to slide within the one or more tracks. Similarly, the upper track may be disposed in the lid and shaped in a c-channel configured to receive the cord disposed on the tent. In other instances, the lower track and upper track may be another shape configured to receive the cord. For example, the tracks may be multiple clips aligned along a singular plane configured to secure the cord in place. The upper and lower track may be the same type of track or different types of tracks. The upper and lower tracks may be in multiple portions surrounding the lid and/or the rim wall. For example, the lower track may include a first portion, a second portion, and a third portion. That is, the lower track may be separated on each side of the rim wall, turning 90 degrees to the next portion. In this manner, the tent may be easier to secure and remove from the track. The tent may also extend over the tracks to improve waterproofing of the interior of the pop-up camper. In other embodiments, the tent may be permanently embedded within the tracks.

In certain embodiments, the tent may include an impermeable surface, a mesh surface, and at least one tent window. The tent may be disposed between the lid and the plurality of walls. That is, the impermeable surface may extend between the lid and the plurality of walls. The at least one tent window may be disposed on the impermeable surface and include a mesh surface over the window. In this manner, the mesh surface allows airflow to pass through the impermeable surface openings. In other embodiments, the entire tent may be a mesh surface. In yet other embodiments, the entire tent may be an impermeable surface.

In certain embodiments, the tent may include a window seal. For example, the window seal may be a fabric (e.g., impermeable surface fabric) configured to zip between an open window position and a closed window position. In the open window position, the window seal may roll onto itself and secure into place at a position on the window. In the closed position, the window seal may zip the window closed to provide a uniform surface (e.g., total impermeable surface) to the tent.

In certain embodiments, the pop-up camper may include at least one window. The window may be transparent or non-transparent. In some instances, the window may rotate out of the pop-up camper. In other instances, the window may be embedded within the plurality of walls and configured to not actuate. In yet other instances, the plurality of walls may rotate much like the door described herein. That is, each of the plurality of walls may rotate to an open position exposing the area above the vehicle bed.

In certain embodiments, the pop-up camper may include a variety of accessories disposed therein. For example, the pop-up camper may include at least one light disposed within the channels on the plurality of walls, a fan embedded within the lid, and/or a set of cabinets anchored within the camper.

Figure 2:
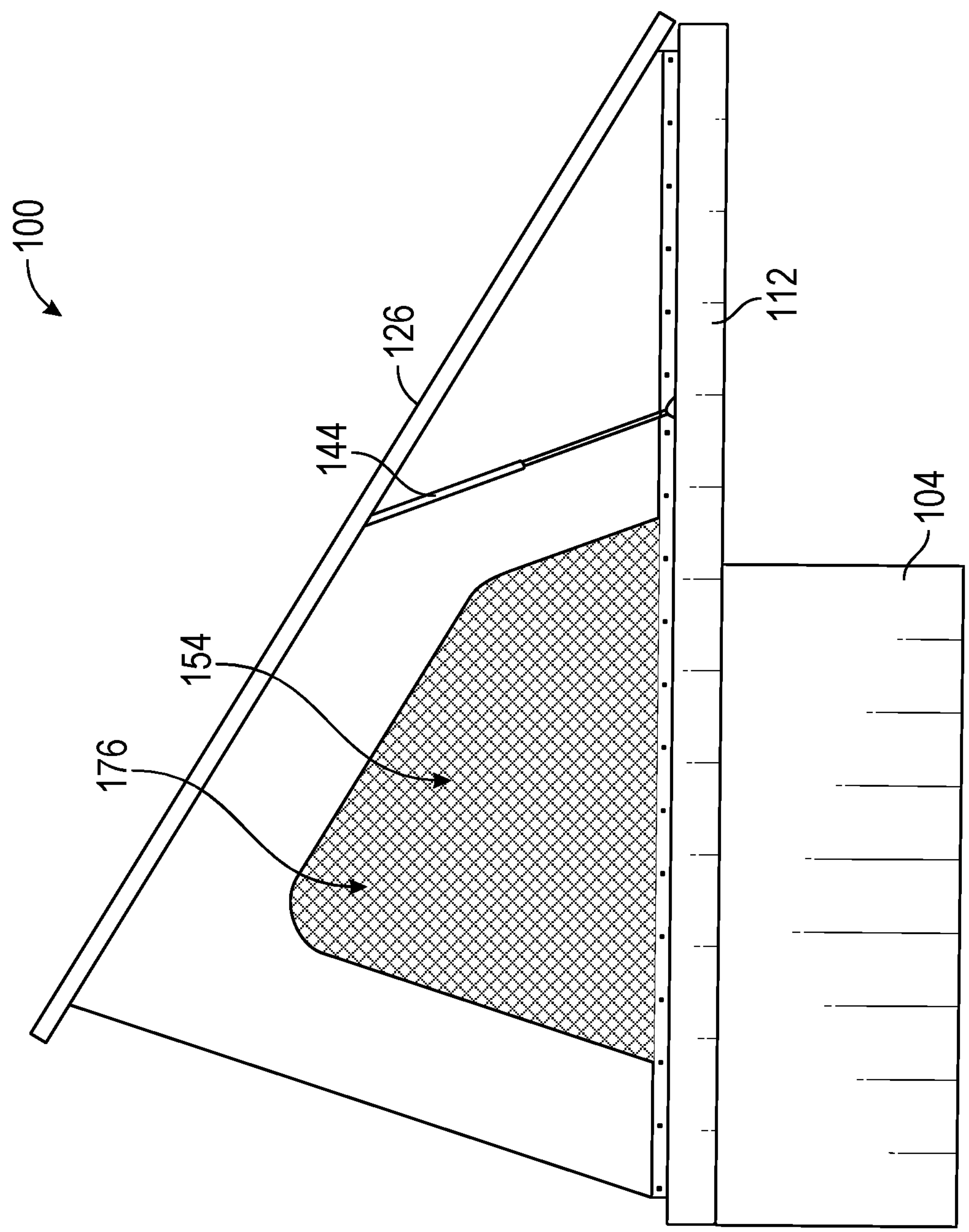
FIG. 2 depicts a side view of the pop-up camper in accordance with one or more embodiments of the disclosure.
Figure 4:
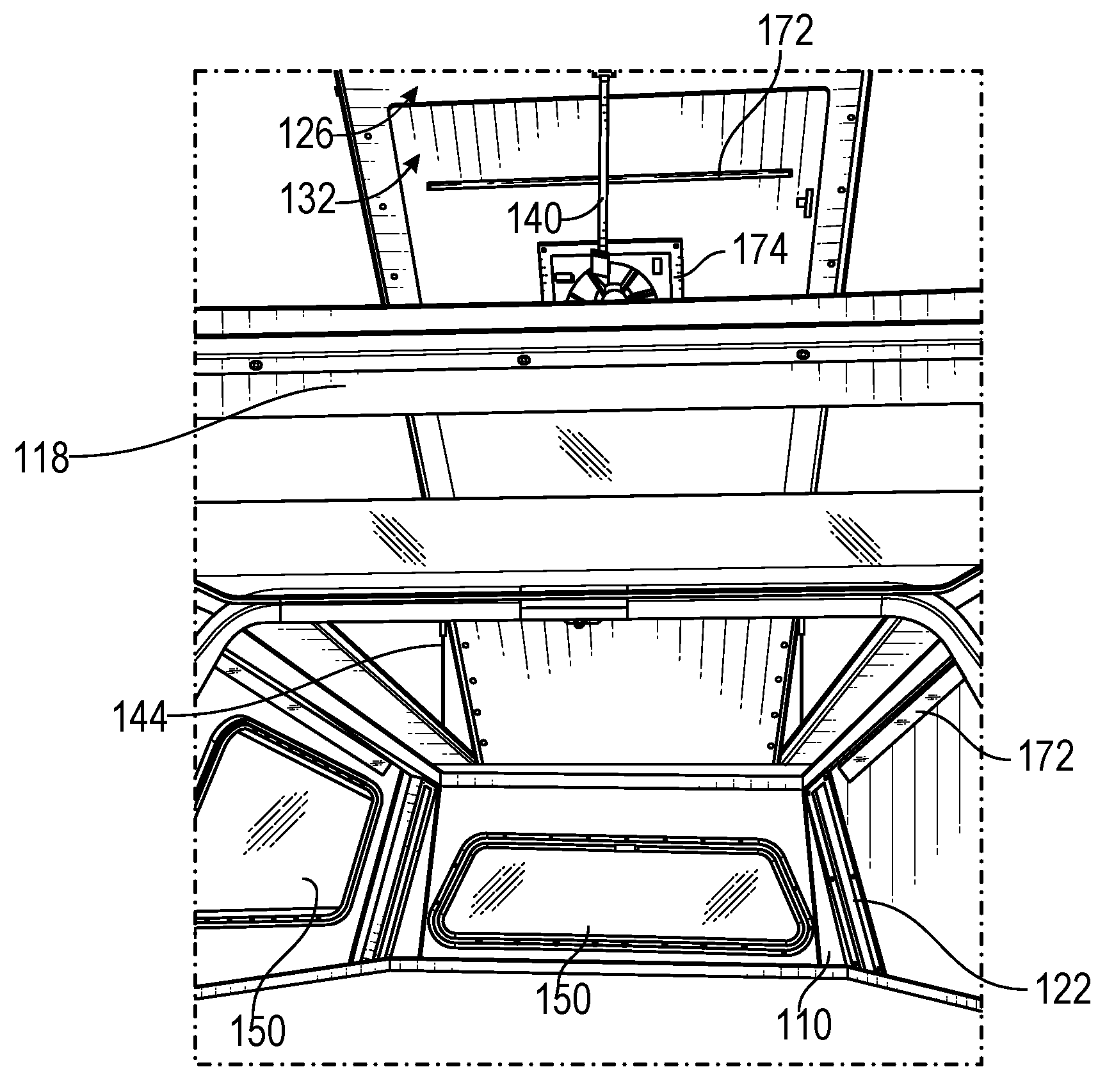
FIG. 4 depicts a rear partial view of the pop-up camper in accordance with one or more embodiments of the disclosure.
Figure 5:
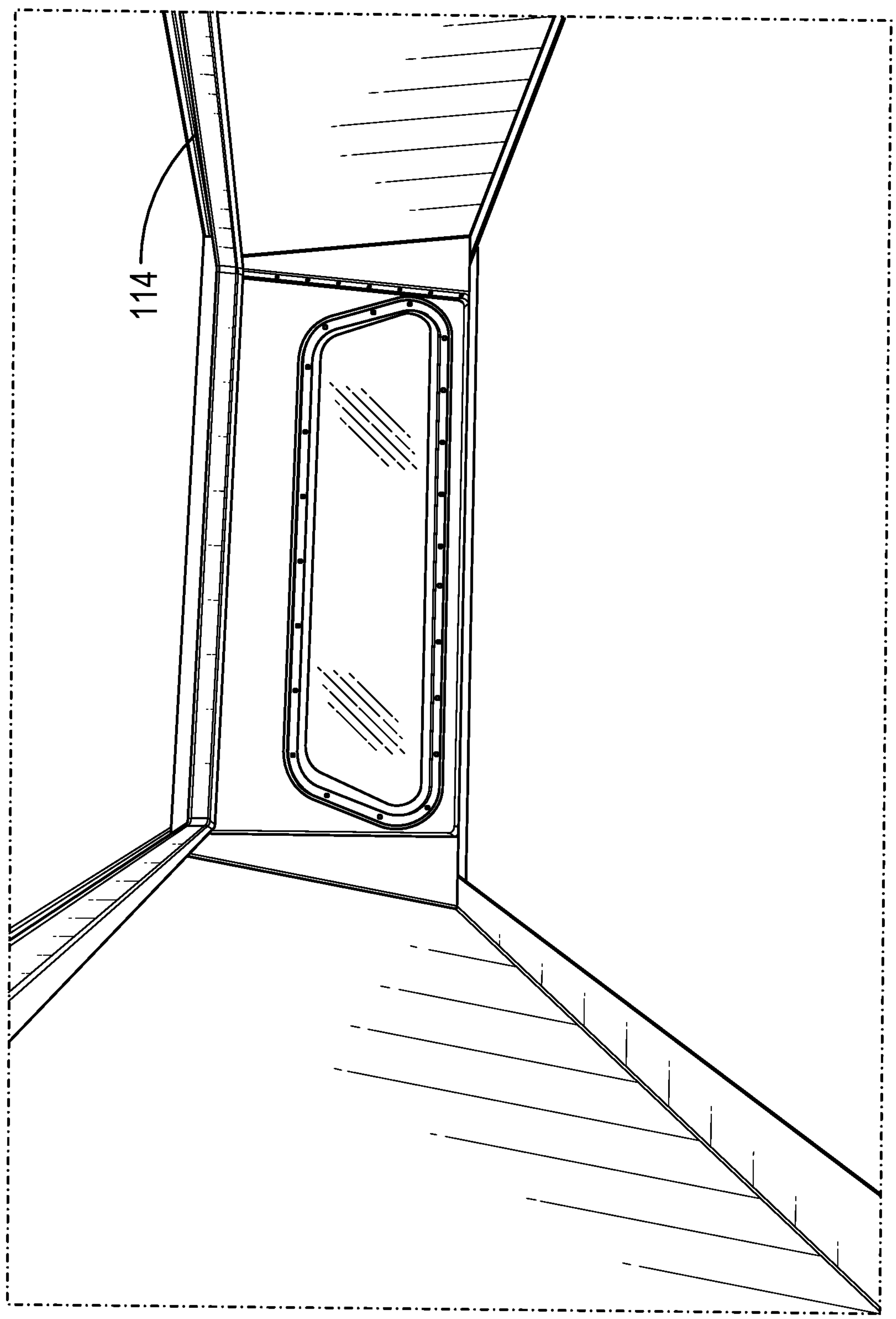
FIG. 5 depicts an internal view of the pop-up camper in accordance with one or more embodiments of the disclosure.
Figure 18:
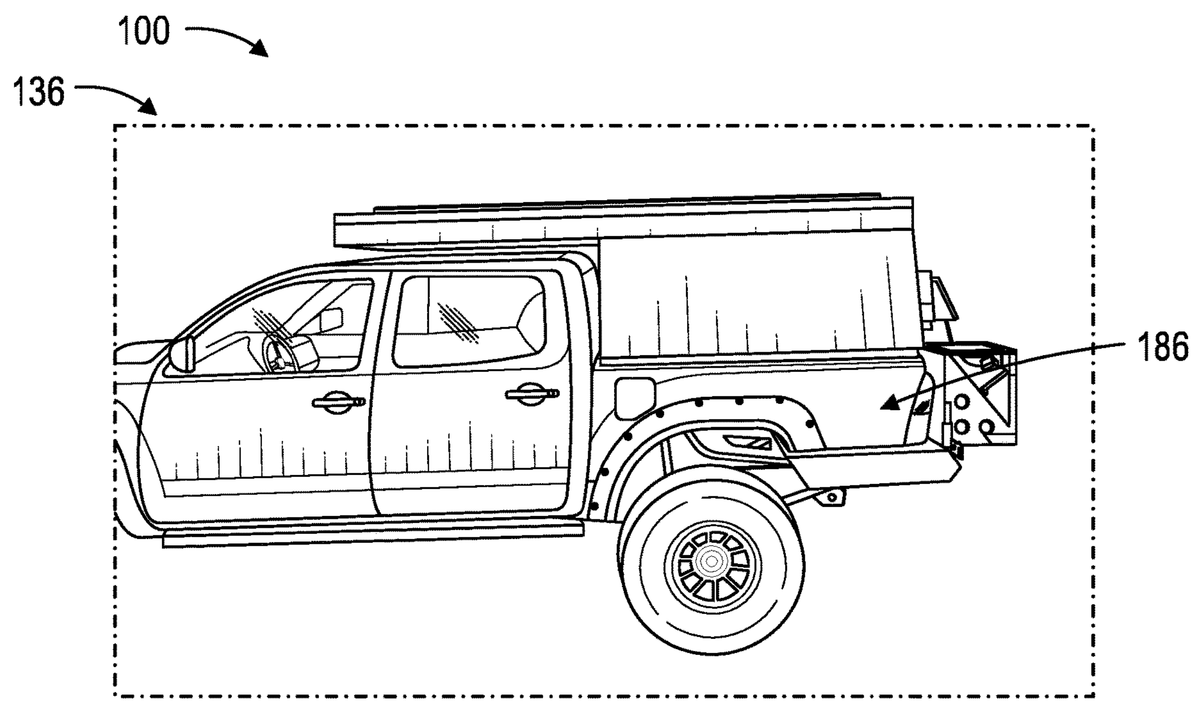
FIG. 18 depicts a side view of the pop-up camper attached to a vehicle in accordance with one or more embodiments of the disclosure.

In some embodiments, as shown in FIGS. 1-2, the pop-up camper 100 includes a plurality of walls 102. For example, the plurality of walls 102 may include a first sidewall 104, a second sidewall 106, a front wall 108, and an opposed rear wall 110 (e.g., as shown in FIG. 4). In this manner, the plurality of walls 102 may create an interior volume when set onto a vehicle bed (e.g., as shown in FIG. 18). Each of the aforementioned walls may be aligned with a vehicle bed. The front wall 108, first sidewall 104, second sidewall 106, and opposed rear wall 110 may support a rim wall 112 and a lid 126. In this manner, the rim wall 112 may be disposed opposite the vehicle bed. In some instances, as shown in FIG. 1, the rim wall 112 may extend beyond the opposed rear wall 110. In this manner, the rim wall 112 may hover and/or rest on the cabin of the vehicle.

In some embodiments, the pop-up camper 100 includes a lid 126. The lid 126 may include at least one hinge 142 about which the lid 126 rotates between an open lid position 134 and a closed lid position 136 (e.g., as shown in FIG. 18). In some instances, the lid 126 may be attached to an actuating mechanism 144 (e.g., gas spring) configured to assist in rotating the lid 126 to the open lid position. The actuating mechanism 144 may be disposed within the edge of the lid so that the mechanism is stored within the lid 126 in the closed lid position. In other instances, the actuating mechanism 144 may be disposed outside the lid 126 in the closed lid position.

In some embodiments, the pop-up camper 100 includes a tent 148 extend between the rim wall 112 and the lid 126. The tent 148 may be composed of an impermeable material configured to prevent water and/or debris from entering the pop-up camper 100. In some instances, the tent 148 may be secured onto the upper track 128 and the lower track 130. In this manner, as the lid 126 rotates to the open lid position 134, the tent 148 may fully extend. The tent 148 may include an outer edge 158 configured to secure the tent 148 within the upper track 128 and lower track 130.

In some embodiments, as shown in FIGS. 1-2, the tent 148 includes at least one tent window 176. Within the ten window 176 may be a mesh surface 154. In this manner, the mesh surface 154 may be breathable. In other instances, the mesh surface 154 may not be breathable. In some embodiments, the mesh surface 154 may be disposed on the exterior of the tent 148 and an interior window seal described herein may close the interior of the mesh surface 154.

Figure 3:
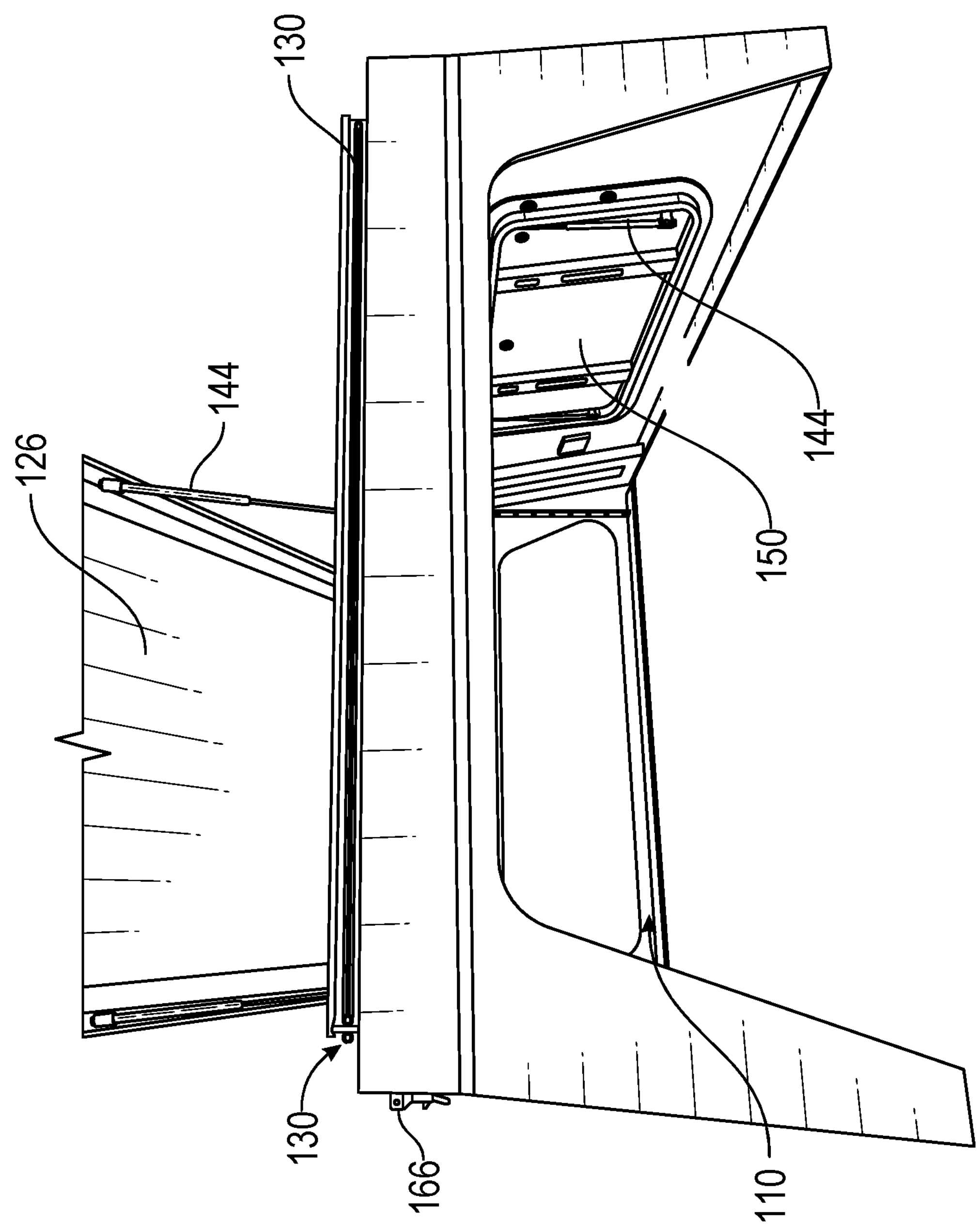
FIG. 3 depicts a perspective rear view of the pop-up camper in accordance with one or more embodiments of the disclosure.

In some embodiments, as shown in FIG. 3, the lid 126 is configured to secure to at least one adjustable latch 166 disposed on the rim wall 112. That is, the lid 126 may rotate to the closed lid position 136, and the adjustable latch 166 secures the lid 126 into place.

In some embodiments, the pop-up camper 100 may include at least one solid window 150 configured to be rotatable about the plurality of walls 102. The at least one solid window 150 may or may not be transparent. In some instances, the windows may include screens, glass, blinds, or other fixture. For example, the windows may include glass configured to rotate between an open window position and a closed window position. Furthermore, the window 150 may include an actuating mechanism 144 configured to assist in rotating the window.

In some embodiments, as shown in FIG. 4, the pop-up camper 100 includes insulation 132 disposed on the lid 126. In this manner, the insulation 132 may be configured to regulate temperature within the pop-up camper 100. In other instances, the insulation 132 may be configured to regulate interior moisture. In some instances, the lid 126 may include a fan 174 disposed through the lid 126. The fan 174 may be adjustable, removable, or otherwise fully customizable in its controls. The pop-up camper 100 may include one or more lights 172 disposed throughout the pop-up camper. The lights 172 may be turned on by a switch. In other instances, the one or more lights 172 may be configured to automatically turn on when the lid 126 is rotated to the open lid position 134.

Figure 6:
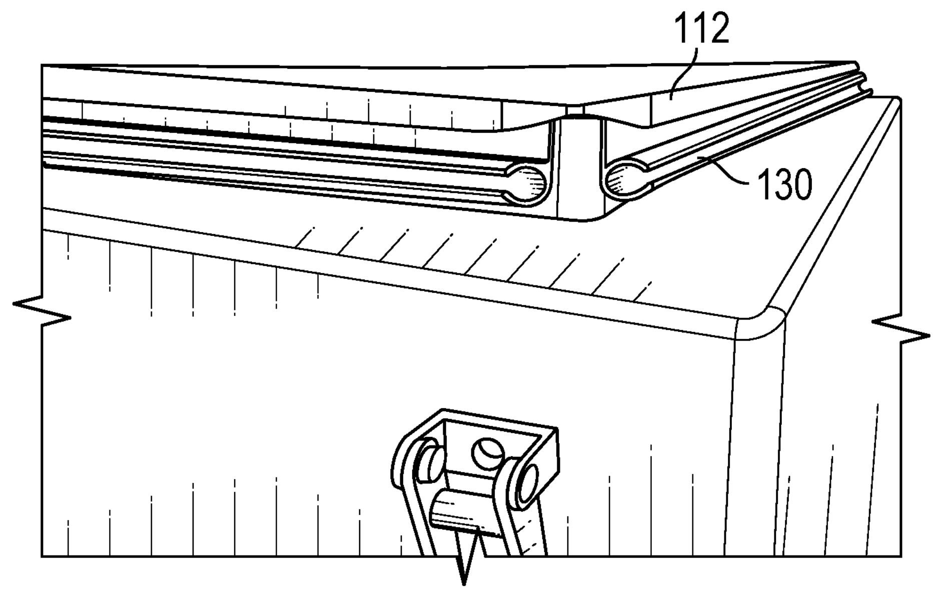
FIG. 6 depicts a side magnified view of a track on the pop-up camper in accordance with one or more embodiments of the disclosure.
Figure 7:
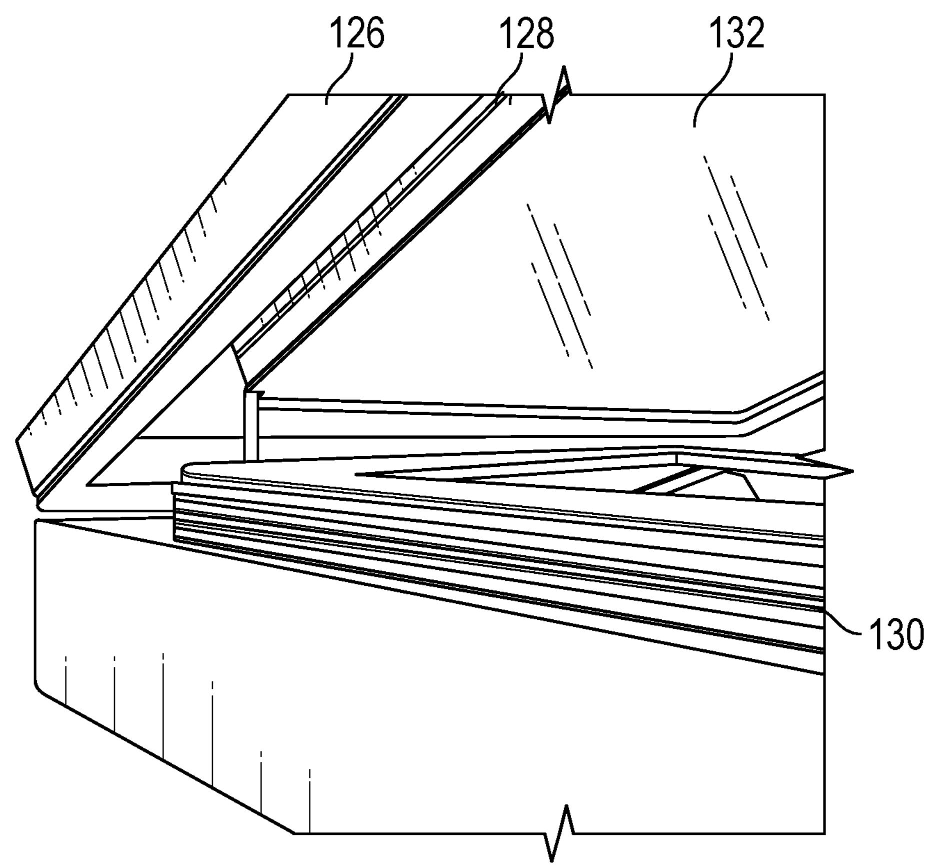
FIG. 7 depicts a rear side view of the track on the pop-up camper in accordance with one or more embodiments of the disclosure.

In some embodiments, as shown in FIGS. 6 and 7, the pop-up camper 100 includes a lower track 130 and an upper track 128. The lower track 130 may be a c-shaped track configured to receive a cord from the tent. The lower track 130 may be disposed along the rim wall 112. The upper track 128, conversely, may be disposed on the lid 126. Each track may be configured to receive and secure the tent. In some instances, the upper track 128 and the lower track 130 may be configured to permanently secure the tent. In other instances, the upper track 128 and the lower track 130 may be configured to operably secure the tent.

Figure 8:
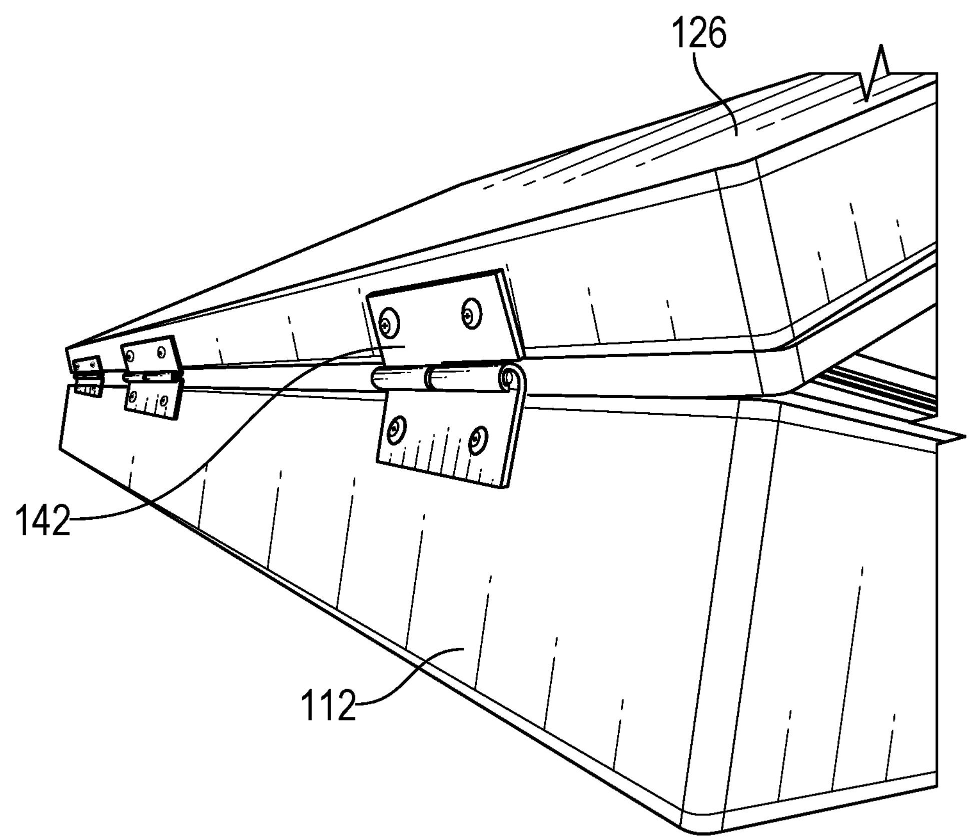
FIG. 8 depicts a front partial view of the pop-up camper in accordance with one or more embodiments of the disclosure.

In some embodiments, as shown in FIG. 8, the pop-up camper 100 includes one or more hinges 142 about which the lid 126 rotates between the open lid position and the closed lid position. In some instances, the hinges may lock the lid 126 into place in an open lid position and a closed lid position.

Figure 9:
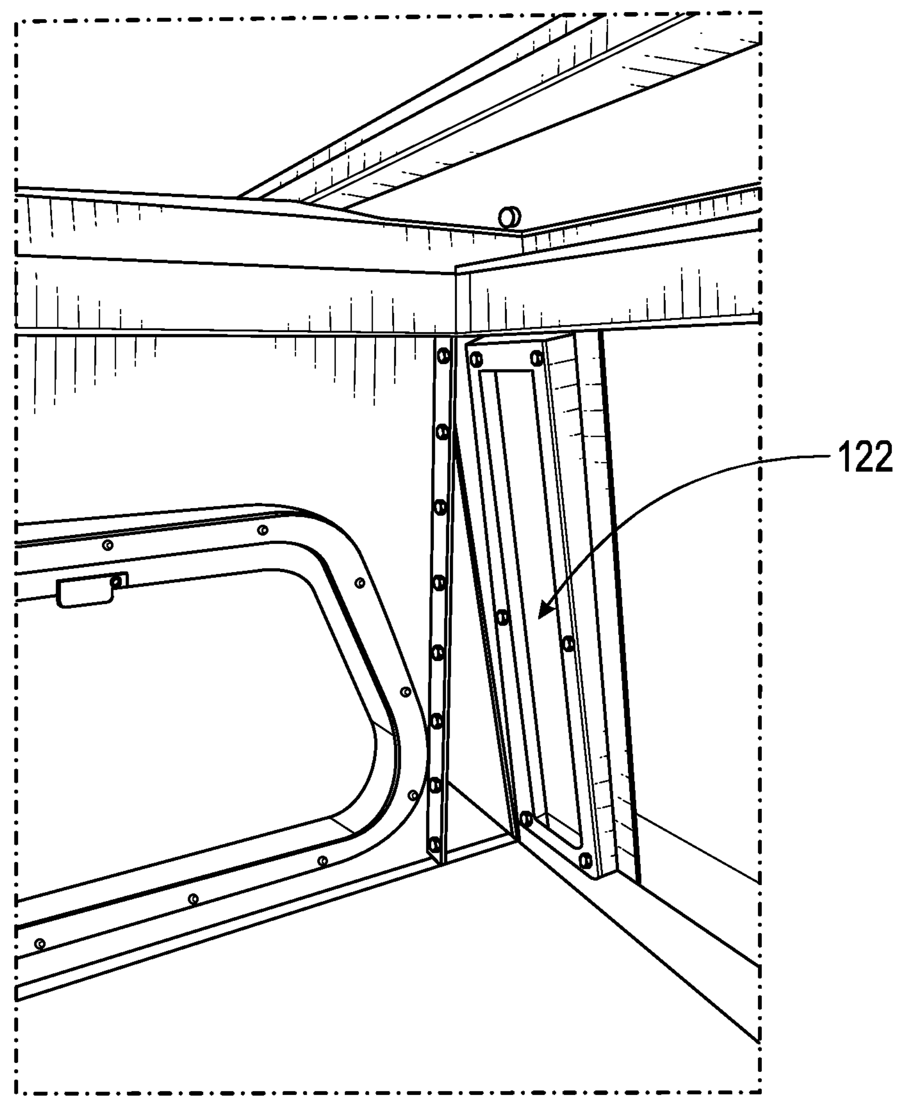
FIG. 9 depicts a perspective view of a utility panel within the pop-up camper in accordance with one or more embodiments of the disclosure.

In some embodiments, as shown in FIG. 9, the pop-up camper 100 includes a utility panel 122 configured to store electronic components and/or other mechanisms. The utility panel 122 may be composed of four walls extending from one of the plurality of sidewalls. In other instances, the utility panel 122 may another shape and include a door that extends opposite the interior of the pop-up camper 100.

Figure 10:
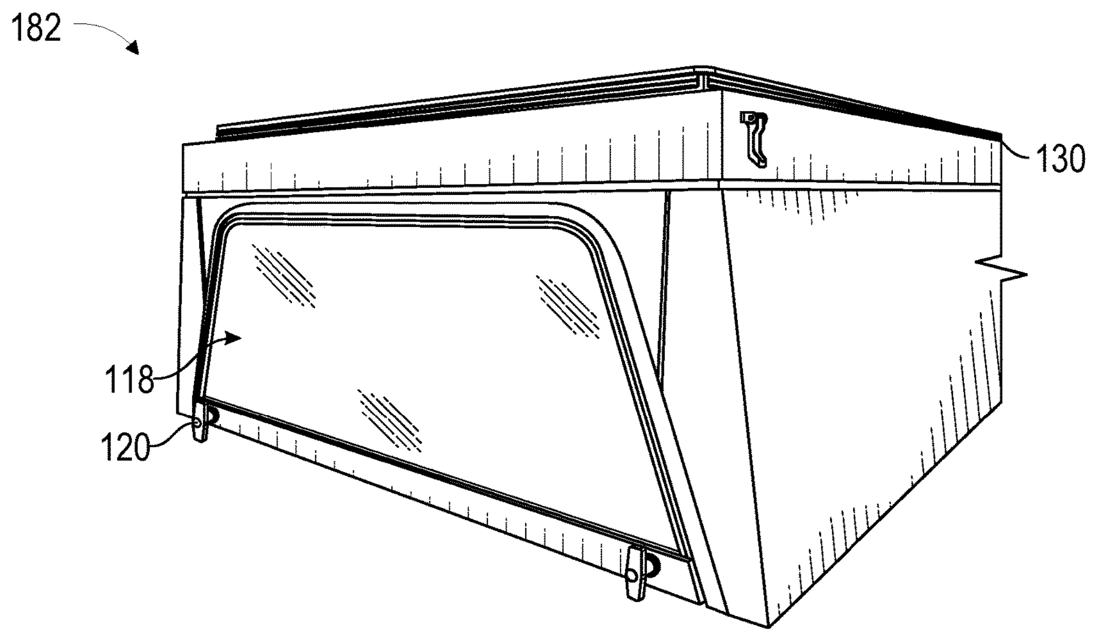
FIG. 10 depicts a side perspective view of a hinged door in a closed position in accordance with one or more embodiments of the disclosure.
Figure 11:
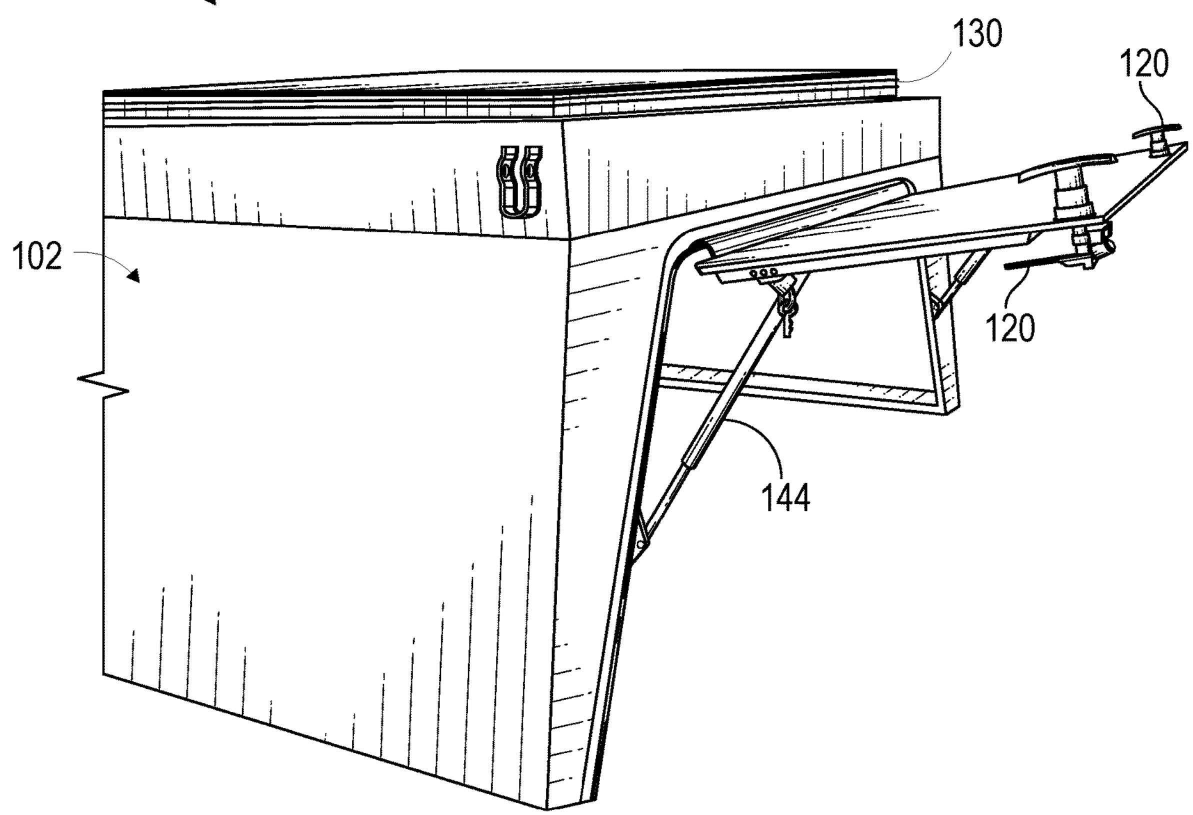
FIG. 11 depicts a second side perspective of the hinged door in an open position in accordance with one or more embodiments of the disclosure.

In some embodiments, as shown in FIGS. 10 and 11, the pop-up camper 100 includes a door 118. That is, the door 118 may actuate between a locked position 182 and an unlocked position 184. In the locked position 182, the door 118 may have one or more door latches 120 configured to secure the door 118 into place. After the door latch 120 is actuated, the door 118 may easily rotate to the unlocked position 184 with the actuating mechanism coupled between the door 118 and the plurality of walls 102.

Figure 12:
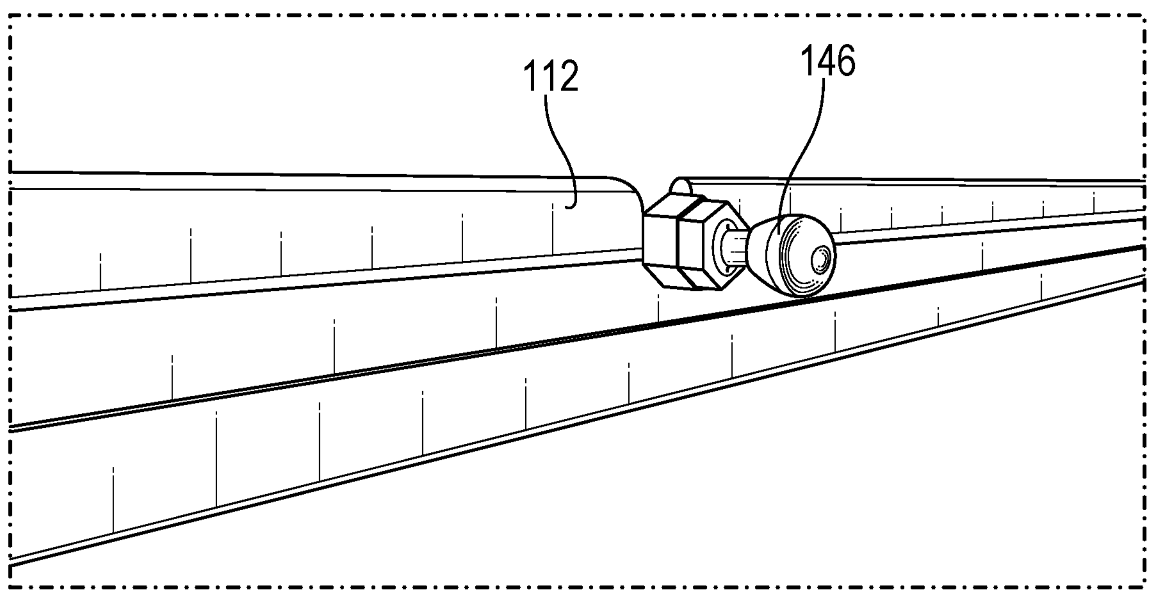
FIG. 12 depicts a mount on the pop-up camper in accordance with one or more embodiments of the disclosure.
Figure 13:
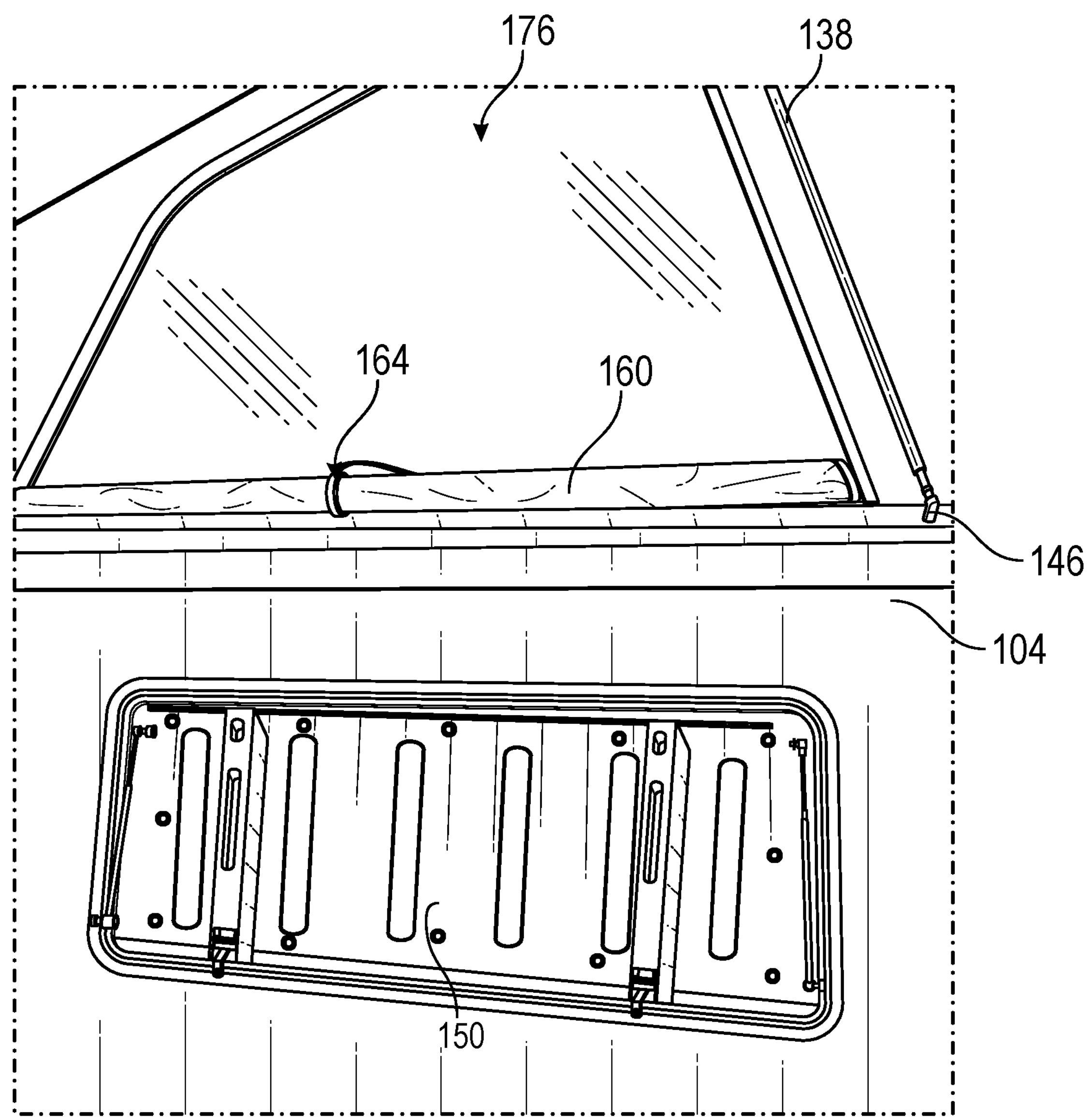
FIG. 13 depicts an internal side view of the pop-up camper in accordance with one or more embodiments of the disclosure.

In some embodiments, as shown in FIGS. 12 and 13, the pop-up camper 100 includes at least one anchor 146. The at least one anchor 146 is configured to receive the lock bar 138 (e.g., shown in FIG. 13). In this manner, once the lid 126 is in the open lid position, the lock bar 138 may be affixed onto the anchors 146 to keep the lid 126 in the open lid position.

In some embodiments, as shown in FIG. 13, the tent 148 includes a window seal 160 configured to close the at least one tent window 176. In this manner, the window seal 160 rolls between a first position (not shown) and a second position 164. The window seal 160 may roll into the second position 164 exposing the window and securing into place with a fastener and/or strap. In other instances, the window seal 160 may be rigid and be configured to be set onto the at least one tent window 176.

Figure 14:
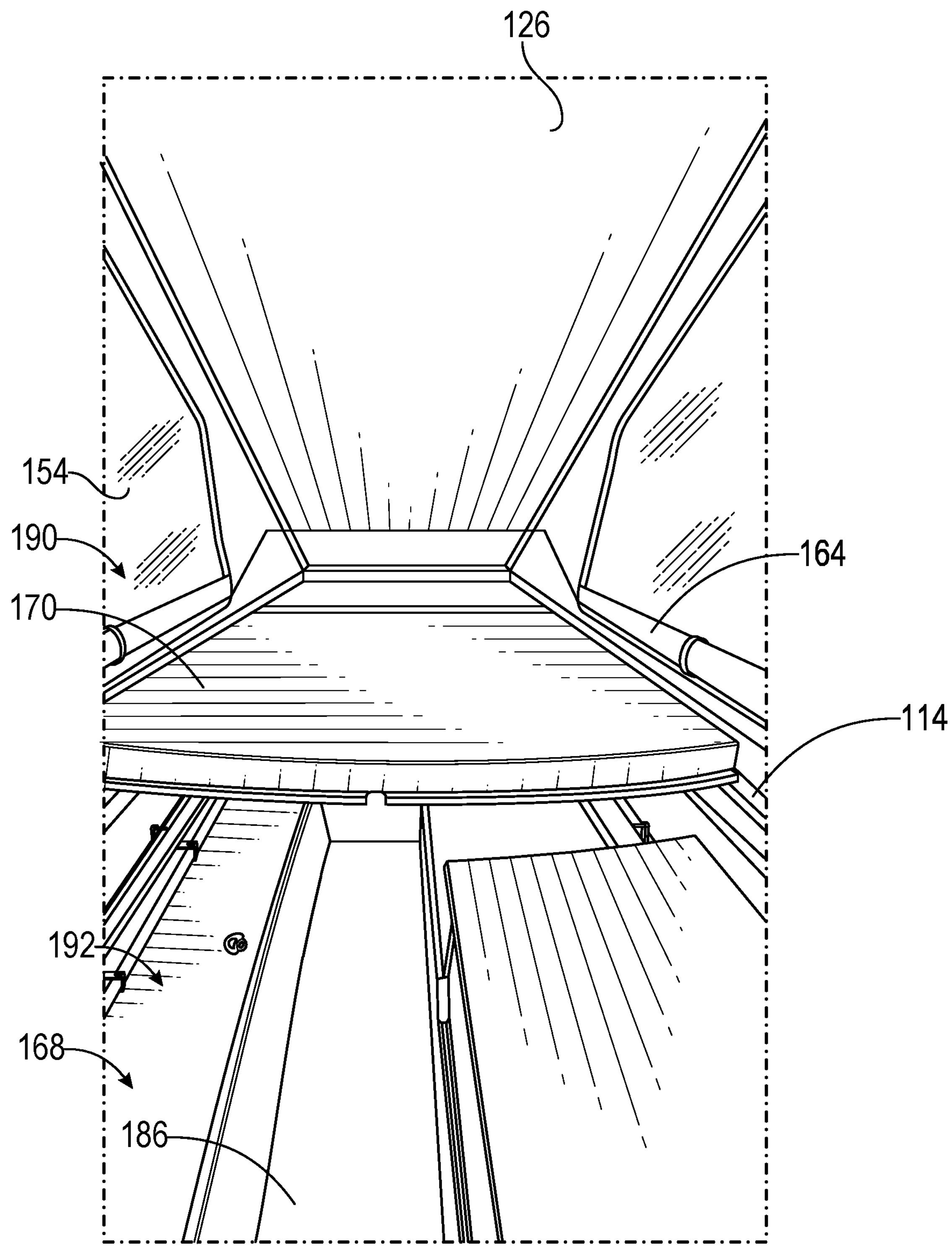
FIG. 14 depicts an internal view of the pop-up camper in an open lid position in accordance with one or more embodiments of the disclosure.
Figure 15A:
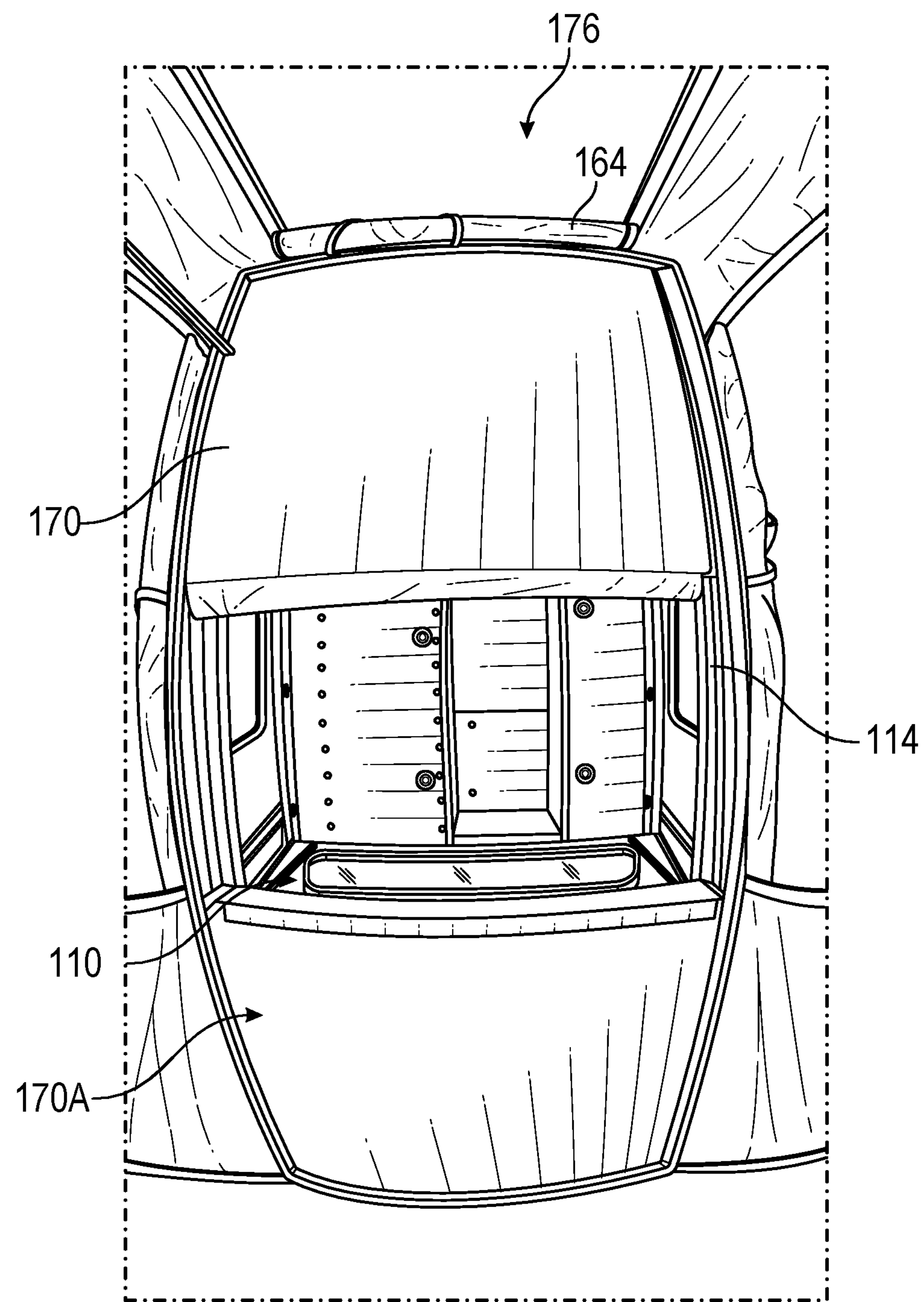
FIG. 15A depicts an internal bird's eye view of the pop-up camper in the open lid position in accordance with one or more embodiments of the disclosure.
Figure 15B:
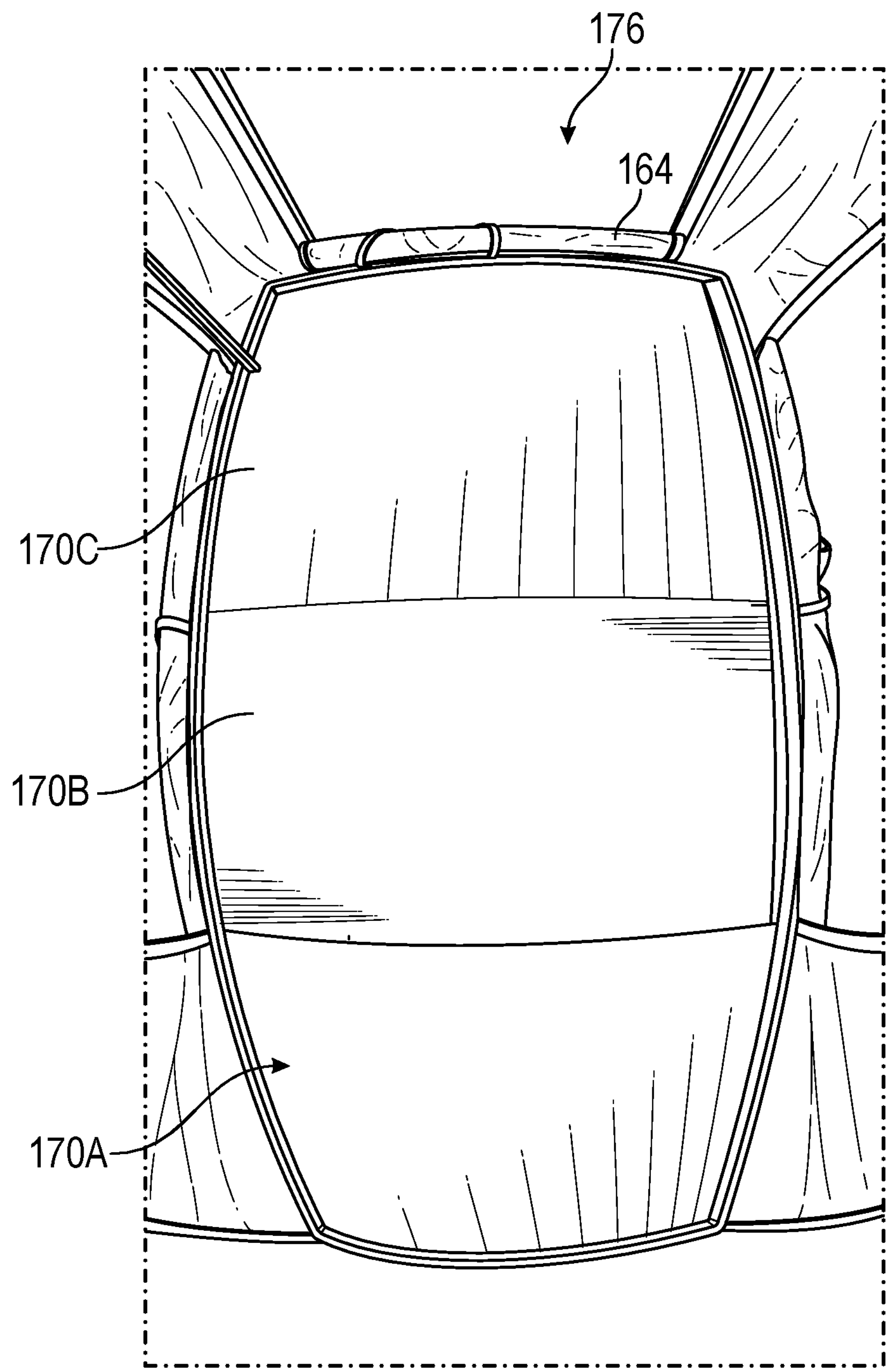
FIG. 15B depicts an internal bird's eye view of the pop-up camper in the open lid position in accordance with one or more embodiments of the disclosure.
Figure 16:
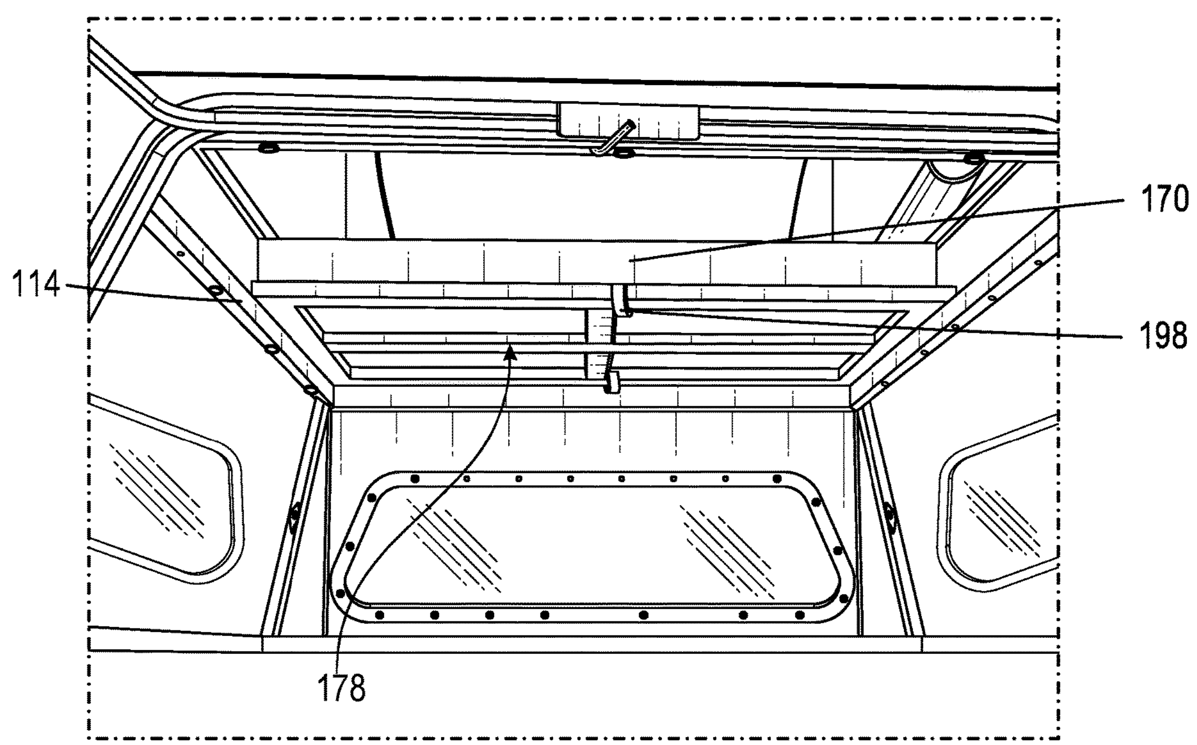
FIG. 16 depicts an internal lower view of the pop-up camper in accordance with one or more embodiments of the disclosure.
Figure 17:
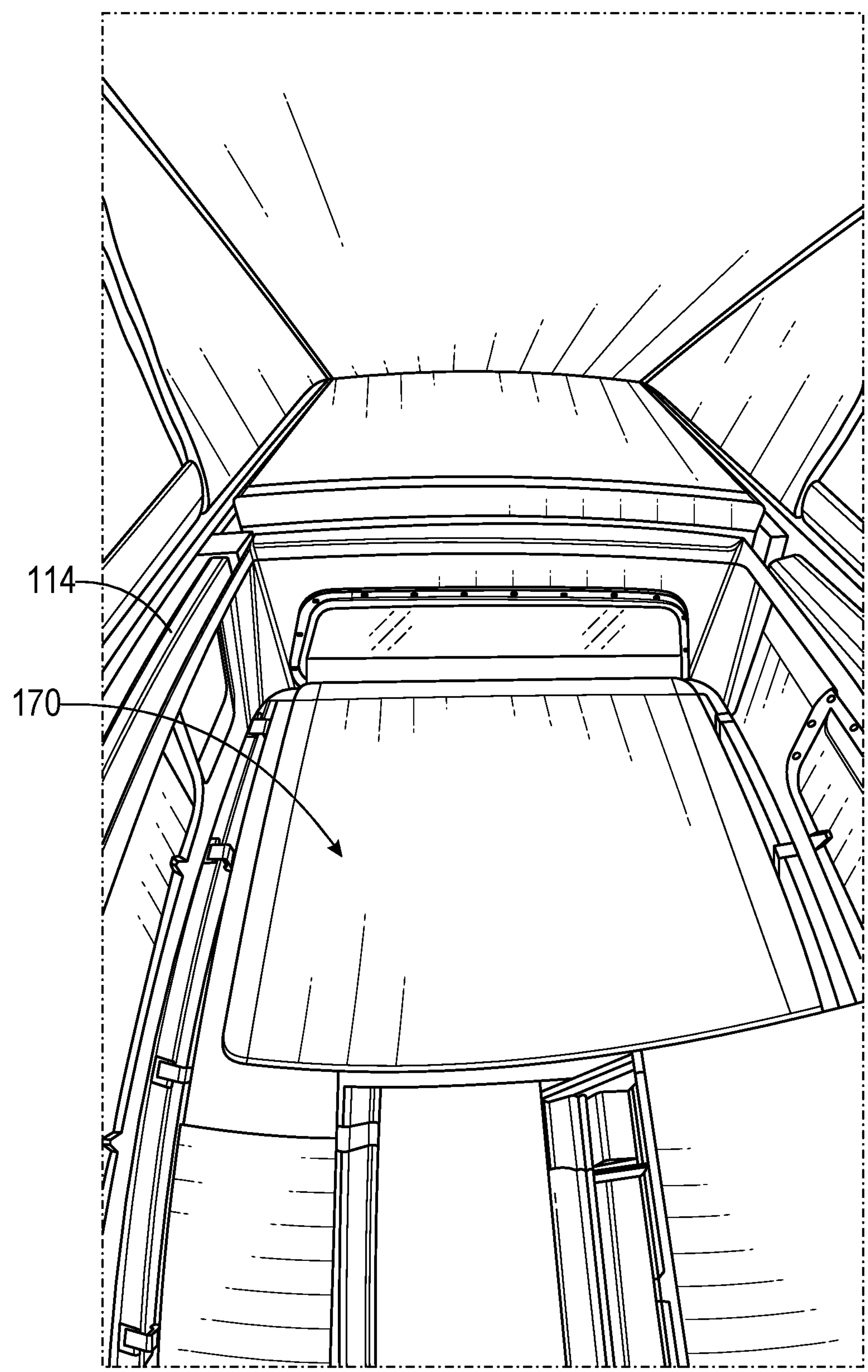
FIG. 17 depicts an internal view of the pop-up camper in accordance with one or more embodiments of the disclosure.

In some embodiments, as shown in FIG. 14, the pop-up camper 100 includes a rail 114 extending from the plurality of walls 102 upon which a plurality of bed panels 170 are set upon. The bed panel 170 may be adjustable along the rail 114, as in slide along the rail 114. In some instances, the bed panels are stackable or adjustable in the angle each are set within the pop-up camper. In some instances, the bed panel 170 may set upon the cabinets 168 disposed within the vehicle bed 186 (e.g., as shown in FIG. 17). As shown, the bed panels 170 may be configured to provide a space for sitting and/or laying as well as standing room within the rest of the pop-up camper. In other instances, the bed panels 170 may extend along the entire length of the rail 114. That is, there may be no standing room between the upper portion 190 of the interior of the pop-up camper and the lower portion 192 of the pop-up camper. As shown in FIG. 15A, the bed panels 170 may be split into two. The bed panels 170 may be split into an indefinite number of sections, between sidewalls as well as between the front wall and the opposed back wall. As mentioned herein, one of the bed panels 170A may be secured in position beyond the opposed back wall 110 (e.g., resting above the vehicle cabin). In some embodiments, as shown in FIG. 15B, the bed panels (e.g., 170A, 170B, 170C) may extend the full rail (not shown) and/or the length of the camper. In some instances, the bed panels may be fixed in place. In other instances, none of the bed panels may be fixed in place. In yet other instances, only one of the bed panels may be fixed into place. As shown in FIG. 16, the bed panel may be supported by the bed panel frame 178. The frame may be a cross. In other instances, the frame may be some other configuration to support the bed panel. The bed panel 170 may include a series of bed frame straps 198 configured to secure and/or configured to move the bed panel frame 178.

Figure 19:
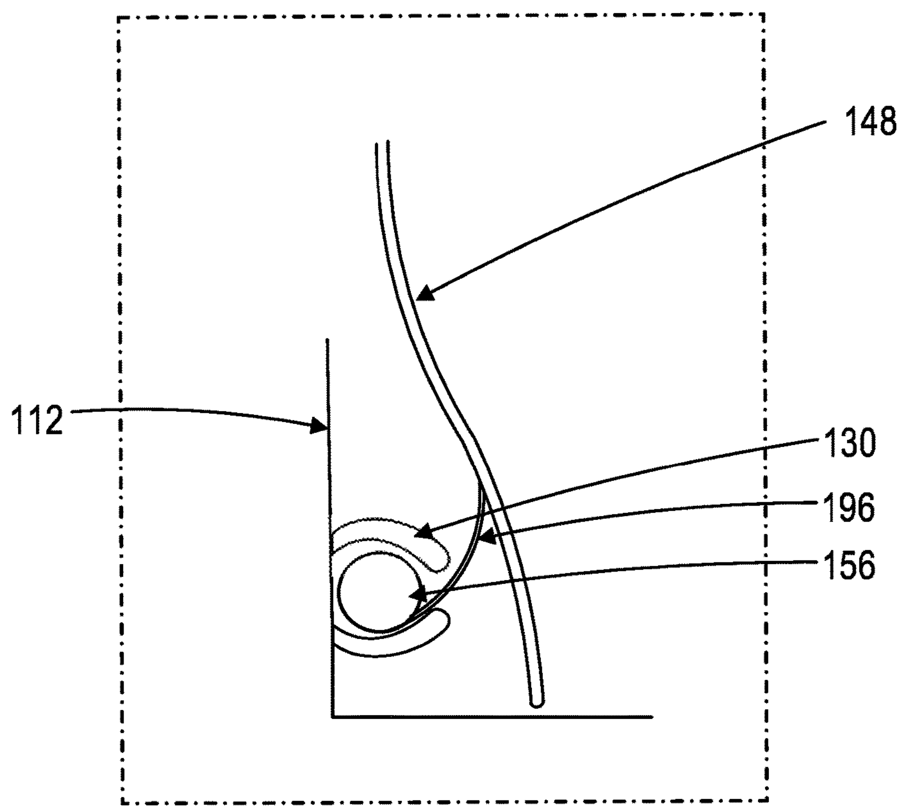
FIG. 19 depicts a cross-sectional view of a lower track in accordance with one or more embodiments of the disclosure.
Figure 20:
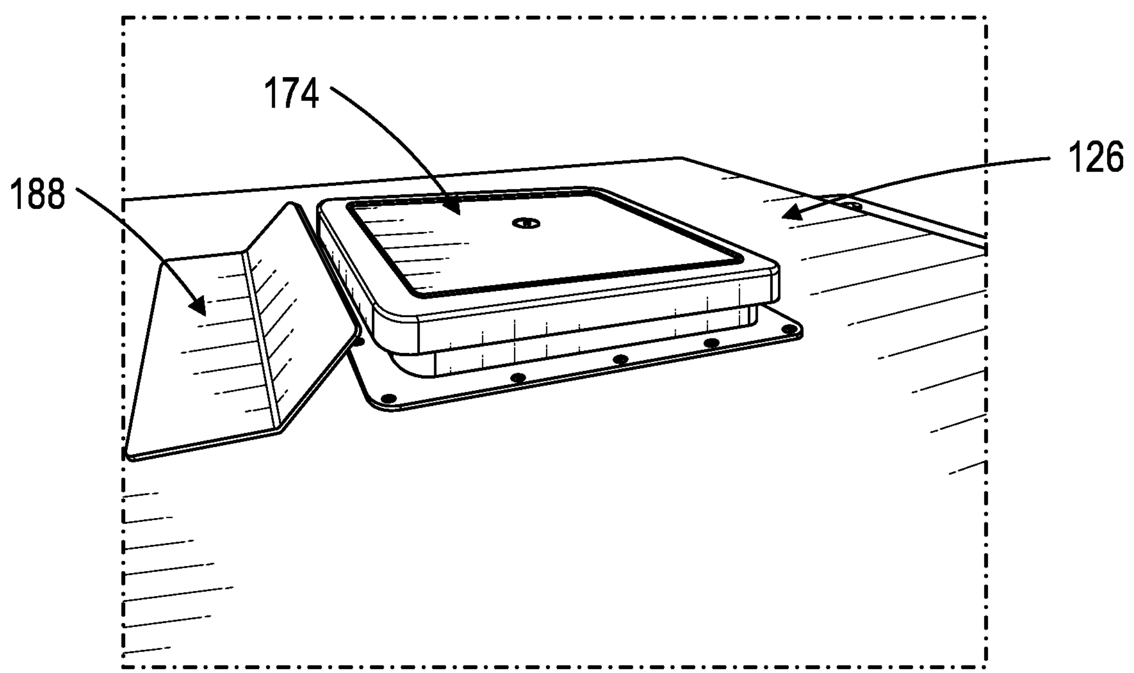
FIG. 20 depicts a top view of a lid fan in accordance with one or more embodiments of the disclosure.
Figure 21:
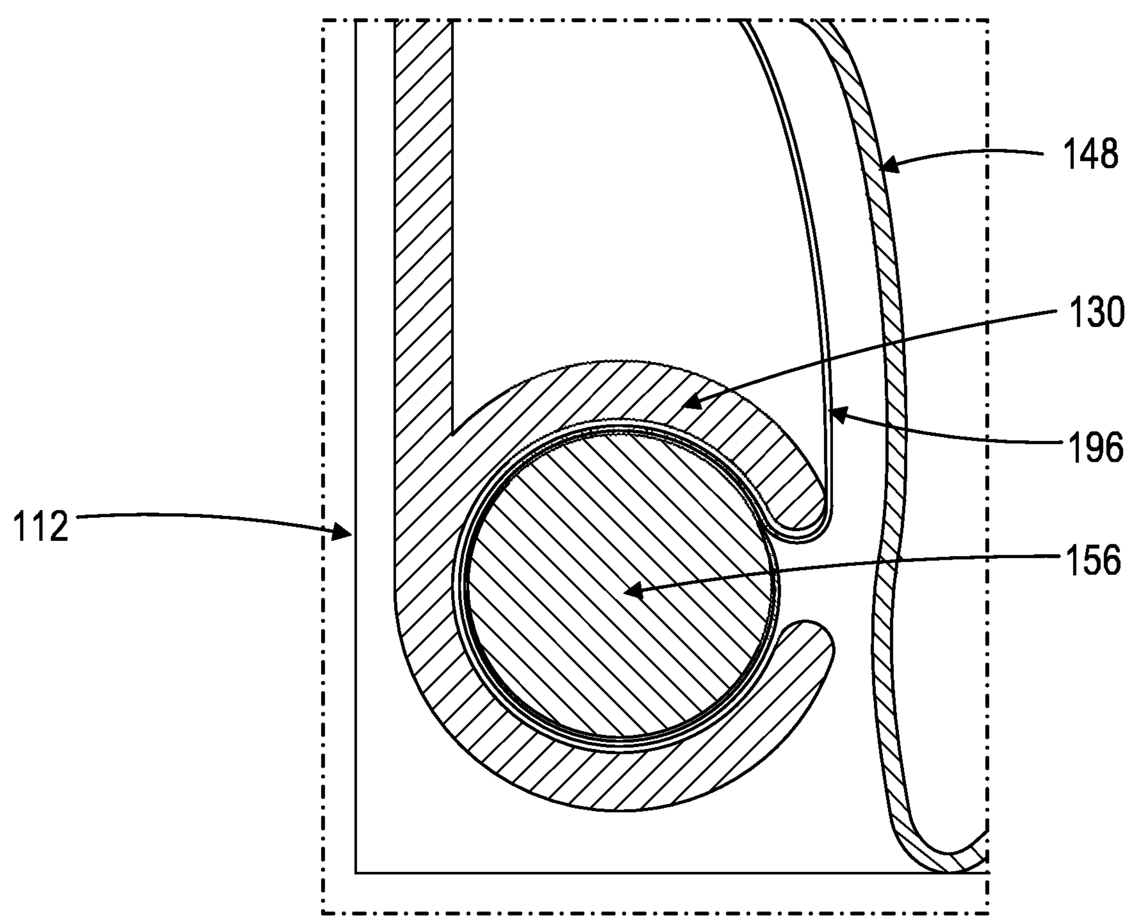
FIG. 21 depicts a cross-sectional view of the lower track in accordance with one or more embodiments of the disclosure.

In some embodiments, as shown in FIGS. 19 and 21, the tent 148 includes a cord 156 along the outer edge 158 and is configured to be disposed in the tracks (e.g., the lower track 130 and the upper track 128) of the pop-up camper 100. In this manner, the cord 156 may slide within each of the tracks. In turn, as shown in FIG. 19, the tent 148 may be configured to extend over the lower track 130. In some instances, the tent 148 may fold away (e.g., uncovering the cord and back onto itself) from the cord 156 to operably place the cord 156 in the track. As depicted in FIG. 19, the cord 156 is coupled to a skirt 196 (e.g., inner skirt) that is sewn onto the tent 148. In some instance, the skirt 196 may be sewn along the tent. In other instances, the skirt 196 may be attached to the tent by another method, including snapped, fastened, stapled, fused, or some other attachment method. The skirt 196 may be an interwoven fabric that is attached to the tent. In other instances, the skirt 196 may be another fabric or synthetic material. The skirt 196 may wrap around the cord or may be attached by another method. As shown, the lower track 130 (e.g., c-channel track) may be disposed on the rim wall 112, and the cord 156 may operably slide within the track 130 to secure the tent 148. The lower track 130 may be continuous around the rim wall 112. In other instances, the lower track 130 and/or the upper track (e.g., as shown in FIG. 7) may be in multiple portions (e.g., a first portion, a second portion, and a third portion). That is, a first portion may be disposed on a first side In some embodiments, as shown in FIG. 20, the pop-up camper 100 lid 126 may include a fan 174 and a lid panel configured to shift air away from the fan as the vehicle travels with the camper.

Embodiments of the present disclosure relate to a pop-up camper that slides onto a vehicle's bed. Certain embodiments include a plurality of walls comprising of a plurality of walls including a lid. The plurality may also include at least one sidewall and a hinged door. The lid may include at least one wall acting as a rotatable hinged roof. The plurality of walls may rest on the vehicle bed and together support the lid. The plurality of walls may also include a hinged door as well as removable or rotatable side panels. The plurality of walls may provide a sturdy base for the lid. Furthermore, the variety of doors and rotatable side panels allows easy access to the vehicle bed. The plurality of walls may include a top edge c-channel running the entire length between the walls. By providing a c-channel, a series of selectively removable floor panels can be set in various patterns within the c-channel. The c-channel beneficially adds rigidity to the walls. The removable floor panels could cover the entire floor and provide support for other floor panels, or the floor panels could be removed to provide an entirely open space within the plurality of walls. For instance, the floor panels, when set in particular patterns, may support a bed and multiple people. The lid may cover and seal the entire plurality of walls. Once closed, the lid may securely latch onto the plurality of walls thus ensuring dirt and debris do not enter the interior of the plurality of walls. The lid may rotate about the hinge and may couple to a set of gas springs that are attached to the plurality of walls. The gas springs would provide a temporary rigid position that a user may adjust to varying angles. The upper portion could even extend beyond the lower portion of walls to provide more space when the lid opens.

Embodiments of the disclosure may include a fabric extending between the plurality of walls (e.g., between the upper portion of walls and the lower portion of walls). In some embodiments, the fabric may be flexible. Flexibility in the fabric allows the fabric to fold onto itself whenever the upper portion of walls is rotated to seal the plurality of walls shut. In certain embodiments, the fabric attaches to each wall by a zipper or has an embedded cord capable of running through a c-shaped channel attached to the appropriate walls. The benefits of such an embodiment consist of quick set-up, take-down, as well as the option to have an "open air" pop-up camper.

In some embodiments, the fabric may comprise at least one window opening. The pop-up camper may have three window openings. The window could comprise three layers: a mesh layer for ventilation, a clear layer for light, and a fabric layer for privacy. Each layer may be removable. For example, each layer surrounding the window could have a zipper that attaches to the fabric. The advantage of allowing the window to be manually operable is to allow a user to select their level of comfort to outdoor exposure. In some instances, the window may be vinyl.

In one embodiment, a pop-up camper in accordance with the present disclosure may be affixed to a vehicle bed. For example, the vehicle bed may be a truck bed or other modified accommodating vehicle. Any vehicle may be used that is configured to accept the pop-up camper.

Other Embodiments

The pop-up camper may include a plurality of walls. The plurality of walls may be welded, bolted, hinged, or otherwise attached to one another. The plurality of walls may be composed of aluminum or fiberglass, among other materials. The plurality of walls may fit onto the back of a vehicle. The plurality of walls may couple to a vehicle bed's rim, project above the roof the vehicle, and extend over the roof of the vehicle. The plurality of walls may slide onto a vehicle bed rim and lock into place. For example, the plurality of walls may lock into place on the rim of a vehicle bed by tact welds, G-clamps, hand-screw clamps, power clamp, screws, bolts, or some combination of fasteners, clamps, and welding. Previous pop-up campers would fit within the vehicle bed where the walls would slide between the tire wells. One benefit to the embodiment is all the space within the vehicle bed is still available for use by a user of the pop-up camper. In one embodiment, the plurality of walls comprises a hinged door, a few sidewalls, and a lid. In the same embodiment, the hinged door and the lid are each rigidly attached to the other walls by a hinge and a set of springs. In other embodiments, the lid is attached by a full hinge, a front pivot hinge, or a scissor hinge.

Each wall of the plurality of walls may be attached by a hinge to the other walls. Each wall may be bound together by other means. Other means could include welds, fasteners, strong adhesives, or some combination thereof. The plurality of walls may be configured to rotate or be selectively removable. For example, each wall of the plurality of walls may be mounted onto a frame that couples to the vehicle bed. Each wall may have a handle configured to help a user lift, rotate, or remove the wall. For example, each wall may be attached to the plurality of walls via a hinge and temporarily affix into place by gas springs coupled between the plurality of walls and the rotatable wall. Furthermore, each wall may have windows embedded within the wall.

In some embodiments, some of the sidewalls in the plurality of walls vary in shape. For example, two solid rectangular sidewalls comprise of parallel facing rectangle sheets of aluminum. A first lateral sidewall and a second lateral sidewall are both c-shaped walls binding the two solid rectangular sidewalls. The first lateral sidewall may face a vehicle's back window. The second lateral sidewall may couple with a hinged door and a set of gas springs for easy access to the interior of the plurality of walls within the pop-up camper. In some embodiments, the sidewall has an interior channel capable of providing a space for running wiring for lights.

The hinged lid may be composed of several different configurations. In one embodiment, the lid is hinged to the plurality of walls. The lid, in the same embodiment, is adjustable via a set of springs. The set of springs may be interchanged, for example, with gas springs, dampers, compression springs, torsion springs, or extension springs. The set of springs may allow the traveler to adjust the lid to varying angles. Gas springs, for example, work by having a piston rod contained within a pressure chamber. The pressure chamber acts to push the piston rod out of the chamber's channel. Thus, when the hinged lid is not latched to the sidewalls the pressure within the gas spring chamber will force the lid to rotate about its hinge. For example, the set of springs may allow a user to lift and set the lid at a 50-degree angle. The user may lift and set the lid to another angle. The lid may couple to the set of springs at one or more sides. For example, the lid may couple to a set of springs at the corners of the lid. In another example, the lid may couple to a set of springs along the edges between the corners of the lid.

The lid may be rectangular, square, circular, or another shape. In some embodiments, the lid may have rounded sides, and in other embodiments, the lid may have sharp corners. The lid may also have other components coupled to the surface. For example, the lid may have adjustable air vents, storage compartments, electric wires, windows, or breathable mesh screens embedded within the lid. For example, storage compartments on the lid could store the removable panels. The lid may also have locking mechanisms to secure the lid to the rest of the plurality of walls. Once closed, the lid may have a screened surface that folds within the closed plurality of walls. To ensure the closed lid and the entire plurality of walls tightly seal out foreign materials (e.g., dirt and debris from the road), the surface on either the lid or the walls may have a bulb seal around the perimeter.

The lid may be coupled to a screened surface. The screened surface may be made of cloth or of synthetic. In one embodiment, the screened surface is made of K-TEX by KEYSTON. K-TEX is an 18-ounce vinyl coated polyester fabric. The screened surface could be a combination of a solid surface and a meshed surface. In some instances, the screened surface may be a solid fiberglass surface. In other instances, the screened surface is a foldable, flexible fabric that stretches between the sidewalls and the lid. Typical pop-up campers do not provide a sufficient seal from the outside elements when the lid is opened or closed. The benefit to coupling the screened surface to the lid and the sidewalls is to prevent the accumulation of dust and debris from the outside world. Furthermore, the screened surface being coupled to the lid and the sidewalls allows quick setup and break down of the pop-up camper. For example, the screened surface may provide a seal by being tightly sown, melted, or otherwise bound to the lid and the plurality of walls. In one embodiment, the screened surface binds between the lid and the sidewalls by a cord attached to the outer edge of the screened surface slide into a rail system that is bound to the lid and the sidewalls. One example of this system is a KEDER cord and rail system. In other embodiments, the screened surface may couple to the lid and the sidewalls by a zipper running the full length of the perimeter. One benefit of a zipper or Keder cord system is easy attachment and detachment of the screened surface.

The screened surface may also completely close to outside elements. For example, the mesh surface on the screened surface may have a solid flap to match the solid surface. The solid flap may close by zipper, latches, string, or other binding material. One benefit of the mesh surface is the ability to view outside of the screened surface without opening the interior to bugs and debris. In some instances, a third layer comprising of a clear vinyl may lay between the mesh surface and the solid flap. The third layer could be removable just like the mesh surface by a fastener or attachment mechanism. The attachment mechanisms could include zippers, buttons, ties, or snaps, among others.

In some embodiments, an adjustable floor may sit on top of the sidewalls. The adjustable floor may rest along the edge of the top of the sidewalls. In some instances, the adjustable floor may couple to the sidewalls by another means such as adjustable latches, fastening pins, or another coupling means. The adjustable floor may be customizable. For example, the adjustable floor may be composed of several removable panels. The removable panels may selectively engage with one another. The removable panels may be rectangular, square, oblong, or other shape. The removable panels may be solid or porous. In some instances, the removable panels may be transparent. The removable panels may be set in varying positions. For example, the removable panels may have a binding mechanism to lock or unlock the panel into place. Locking the panels into place, in varying positions, could create different leveled surfaces. In other instances, the removable panels could all align in a plane. For example, the removable panels may be set inside the sidewall to make a level floor. In some instances, one or more removable panels may be removed from inside the sidewall. In other embodiments, the removable panels may spread apart, stack, or adjust to be a seat.

The removable panels may adjust to configure a seat or a bedding area. In some embodiments the removable panels are of different sizes and shapes. Some panels can be rectangular while others can be square. In other embodiments, the removable panels can be of the same size and shape. One shortcoming of previous pop-up campers is the failure to allow for adjustable surfaces. One benefit of having adjustable surfaces, such as removable floor panels, is to allow for greater customization of usable space for various purposes. For example, if one panel is removed, the user will have an easy space to traverse through the upper portion of the camper and the portion open to the truck bed.

In some instances, the removable panels sometimes have a lip (i.e., also referred to as a support projection) to give support to other panels. Sometimes the removable panels may include a drainage path in case of spills. In some embodiments, the removable panels may be carpeted. In other embodiments, the removable panels may have a tiled surface, textured surface, synthetic surface, or cushioned surface, among others. Each removable panel may have rollers to set along the edge of the sidewalls. The rollers may allow for easy adjustment of the removable panels. The removable panels may have wheels along the edges to allow easy adjustment of the panels. In some instances, the removable panels may move by wheels, rails, rolling pins, a slick surface, or some other method. In one embodiment, the removable panels are set along a rail that runs parallel to an opposing rail on the opposite sidewall.

In some instances, each removable panel may have a crossbar within the panel for support. Sometimes each removable panel may have a different support system to keep the floor level. For example, each removable panel may be wood with a metal alloy frame. The metal alloy frame may interlock with the other removable panels and the sidewalls. In other instances, the removable panels may be made of a composite material, metal alloy, wood, plastic, or some combination therein. The removable panels may interlock and prevent movement by a variety of methods including latches, friction, locks, zippers, by means of interlocking shapes, or by some other means.

The plurality of walls includes a hinged door. The hinged door may be coupled to a set of springs that allows for adjustment of the hinged door. The set of springs may be interchanged, for example, with gas springs, dampers, compression springs, torsion springs, or extension springs. The set of springs may allow the traveler to adjust the hinged door to varying angles. For example, the set of springs may allow a user to lift and set the hinged door at a 90-degree angle. The user may lift and set the hinged door to another angle. The hinged door may couple to the set of springs at one or more sides. For example, the hinged door may couple to a set of springs at the corners of the hinged door. In another example, the hinged door may couple to a set of springs along the edges between the corners of the lid. In one embodiment, the hinged door may have a set of windows as well as have other components. For example, one component the hinged door may have is a locking mechanism. The locking mechanism could interlock with an aperture on a vehicle's tailgate. The hinged door may not be hinged, but rather could be detachable or placed upon a sliding mechanism.

Example Embodiments

In some instances, the following examples may be implemented together or separately by the systems and methods described herein.

Example 1 may include a pop-up camper to be mounted on a vehicle. The pop-up camper may include a plurality of walls. The plurality of walls including at least one sidewall, a lid hinged to the at least one sidewall, and a door coupled to the at least one sidewall. The pop-up camper may also include a tent configured to be coupled between the lid and the at least one sidewall as well as at least one actuating mechanism coupled to the lid and the at least one sidewall. The lid may rotate between an open lid position and a closed lid position, wherein the actuating mechanism is configured to assist the lid rotation to the open lid position.

Example 2 may include the pop-up camper of example 1 and a rim wall mounted on the at least one sidewall. The pop-up camper may include a lower track extending along the rim wall and an upper track extending along the lid. The tent may secure into the upper track and the lower track.

Example 3 may include the pop-up camper of example 1 where the plurality of walls include a first sidewall, a second sidewall, a front wall, and an opposed back wall. The front wall and the opposed back wall may secure the first sidewall and second sidewall.

Example 4 may include the pop-up camper of example 1 where the door couples to at least one set of springs. The at least one set of springs may attach to the at least one sidewall. Additionally, the at least one set of springs may be configured to allow door rotation to a selectively rigid position.

Example 5 may include the pop-up camper of example 1 with a plurality of bed panels configured to mount within the plurality of walls.

Example 6 may include the pop-up camper of example 5 with the plurality of walls comprising a rail configured to secure the bed panels.

Example 7 may include the pop-up camper of example 1 where the actuating mechanism is selected from the group consisting of gas springs, dampers, compression springs, torsion springs, and extension springs.

Example 8 may include the pop-up camper of example 1. The pop-up camper may include a set of anchors coupled to the plurality of walls and a lock bar configured to secure between the set of anchors. The lock bar may be configured to secure the lid in the open lid position.

Example 9 may include the pop-up camper of example 1. The tent of example 8 may include a cord along an outer edge of the tent, wherein the cord secures the tent in the lower track.

Example 10 may include the pop-up camper of example 1. The tent may include an impermeable surface, at least one mesh window disposed on the impermeable surface, and a window seal disposed over the at least one mesh window. The window seal may be configured to zip between a first position and a second position, the second position configured to close the at least one mesh window.

Example 11 may include the pop-up camper of example 1 where the plurality of walls include a utility panel disposed within the plurality of walls.

Example 12 may include the pop-up camper of example 1. The pop-up camper may include an interior channel disposed within the plurality of walls.

Example 13 may include the pop-up camper of example 1. The pop-up camper may include a lower track comprising a first portion, a second portion, and a third portion, wherein the tent is configured to extend over the lower track.

Example 14 may include the pop-up camper of example 1 where the door comprises at least one latch configured to actuate between a locked position and an unlocked position.

Example 15 may include a pop-up camper. The pop-up camper may include a plurality of walls configured to slide onto a vehicle bed. The plurality of walls may include at least one sidewall, a lid disposed on the at least one sidewall, and a rim wall disposed on the at least one sidewall. The pop-up camper may include a tent extending between the lid and the rim wall where the lid rotates between an open lid position and a closed lid position. in the open lid position the tent may extend between the rim wall and the lid. A set of anchors may be disposed on the plurality of walls. One of the set of anchors is disposed on the lid and the second of the set of anchors is disposed on the rim wall. A lock bar may be configured to mount between the set of anchors. The lock bar may be configured to secure the lid in the open lid position.

Example 16 may include the pop-up camper of example 15. The pop-up camper; may include an actuating mechanism extending between the at least one sidewall and the lid. The actuating mechanism is configured to assist rotating the lid to the open lid position.

Example 17 may include the pop-up camper of example 15. The pop-up camper may include a utility panel disposed within the plurality of walls.

Example 18 may include the pop-up camper of example 15. The pop-up camper may include insulation disposed on the plurality of walls.

Example 19 may include the pop-up camper of example 15 with a fan disposed on the pop-up camper.

Example 20 may include a pop-up camper. The pop-up camper may include a plurality of walls configured to slide onto a vehicle bed. The plurality of walls include at least one sidewall, a lid hinged to the at least one sidewall, and a door coupled to the at least one sidewall. The pop-up camper may include a plurality of bed panels secured within the plurality of walls. Furthermore, the camper may include a tent configured to be coupled between the lid and the at least one sidewall. The pop-up camper may include at least one actuating mechanism coupled to the lid and the at least one sidewall. The lid may rotate between an open lid position and a closed lid position. The actuating mechanism may be configured to assist the lid rotation to the open lid position.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described exemplary embodiments but should be defined only in accordance with the following claims and their equivalents. The foregoing description has been presented for the purposes of illustration and description. It is not intended to be exhaustive or to limit the present disclosure to the precise form disclosed. Many modifications and variations are possible in light of the above teaching. Further, it should be noted that any or all of the aforementioned alternate implementations may be used in any combination desired to form additional hybrid implementations of the present disclosure. For example, any of the functionality described with respect to a particular device or component may be performed by another device or component. Further, while specific device characteristics have been described, embodiments of the disclosure may relate to numerous other device characteristics. Further, although the embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

The invention claimed is:

1. A camper, comprising:

a plurality of walls, the plurality of walls comprising:
  a first wall,
  a lid hinged to at least one wall in the plurality of walls,
  a door coupled to a second wall, and
  at least one sidewall;

a tent configured to be coupled between the plurality of walls and the lid;

at least one actuating mechanism coupled to the lid and the first wall;

a rim wall mounted on the at least one sidewall;

a lower track extending along the rim wall; and an upper track extending along the lid, wherein the tent secures into the upper track and the lower track, wherein the lid is moveable between an open lid position and a closed lid position, wherein the actuating mechanism is configured to assist the lid to move to the open lid position.

2. The camper of claim 1, wherein the first wall is a front wall, the second wall is an opposed back wall, and the plurality of walls comprises:

a first sidewall;

a second sidewall;

the front wall; and the opposed back wall, wherein the front wall and the opposed back wall secure the first sidewall and second sidewall.

3. The camper of claim 1, wherein the door couples to at least one set of springs, wherein the at least one set of springs attaches to at least one sidewall, the at least one set of springs configured to allow door rotation to a selectively fixed position.

4. The camper of claim 2, further comprising a plurality of bed panels configured to be received by the plurality of walls.

5. The camper of claim 4, further comprising a rail extending approximate to the first sidewall and the second sidewall, wherein at least one bed panel of the plurality of bed panels is configured to selectively secure to the rail.

6. The camper of claim 1, wherein the actuating mechanism comprises at least one of gas springs, dampers, compression springs, torsion springs, or extension springs.

7. The camper of claim 1, further comprising:

a set of anchors coupled to the plurality of walls, the set of anchors comprising a first anchor attached to the lid, and a second anchor attached to the first wall; and a lock bar comprising a first end and a second end, wherein the first end is configured to be detachably engaged to the first anchor and the second end is configured to be detachably engaged to the second anchor, wherein the lock bar is configured to secure the lid in the open lid position.

8. The camper of claim 1, wherein the tent comprises:

a cord comprising an inner skirt coupled to the tent, wherein the cord is configured to be received by the lower track.

9. The camper of claim 1, wherein the tent comprises:

an impermeable surface;

at least one mesh window disposed on the impermeable surface; and a window seal disposed over the at least one mesh window, wherein the window seal is configured to zip between a first position and a second position, the second position configured to close the at least one mesh window.

10. The camper of claim 1, wherein the plurality of walls comprise a utility panel disposed within the plurality of walls.

11. The camper of claim 1, further comprising an interior channel disposed within the plurality of walls.

12. The camper of claim 8, wherein lower track comprises a first portion, a second portion, and a third portion, wherein the tent is configured to selectively extend over the lower track.

13. The camper of claim 1, wherein the door comprises at least one latch configured to actuate between a locked position and an unlocked position.

14. A camper, comprising:

a plurality of walls configured to slide onto a vehicle bed, the plurality of walls comprising at least one sidewall, a lid disposed on the at least one sidewall, and a rim wall disposed on the at least one sidewall;

a tent extending between the lid and the rim wall, wherein the lid rotates between an open lid position and a closed lid position, in the open lid position the tent extends therewith;

a set of anchors disposed on the plurality of walls, wherein one of the set of anchors is disposed on the lid and the second of the set of anchors is disposed on the rim wall;

a lock bar configured to mount between the set of anchors, the lock bar configured to secure the lid in the open lid position; and a cord comprising an inner skirt coupled to the tent, wherein the cord is configured to be received by a lower track extending along the rim wall.

15. The camper of claim 14, further comprising an actuating mechanism extending between the at least one sidewall and the lid, wherein the actuating mechanism is configured to assist rotating the lid to the open lid position.

16. The camper of claim 14, further comprising a utility panel disposed within the plurality of walls.

17. The camper of claim 14, further comprising insulation disposed on the plurality of walls.

18. The camper of claim 14, further comprising a fan.

19. A camper, comprising:

a plurality of walls configured to slide onto a vehicle bed, the plurality of walls comprising:

at least one sidewall, a lid hinged to the at least one sidewall, and a door coupled to the at least one sidewall;

a rail extending from the plurality of walls;

a plurality of bed panels secured upon the rail within the plurality of walls;

a tent configured to be coupled between the lid and the at least one sidewall; and at least one actuating mechanism coupled to the lid and the at least one sidewall, wherein the plurality of bed panels are adjustable by sliding along the rail, and wherein the lid rotates between an open lid position and a closed lid position, wherein the actuating mechanism is configured to assist the lid rotation to the open lid position.

* * * * *